United States Patent [19]

Yamamura et al.

[11] Patent Number: 5,444,351
[45] Date of Patent: Aug. 22, 1995

[54] SYSTEM AND METHOD FOR CONTROLLING INDUCTION MOTOR APPLICABLE TO ELECTRIC MOTOR-DRIVEN VEHICLE

[75] Inventors: Yoshinori Yamamura, Yokohama; Yasuki Ishikawa, Sagamihara; Yasuhiko Kitajima; Kazuma Okura, both of Yokosuka; Hidetoshi Nojiri, Ebina, all of Japan

[73] Assignee: Nissan Motor Co., Ltd., Yokohama, Japan

[21] Appl. No.: 267,930

[22] Filed: Jul. 6, 1994

[30] Foreign Application Priority Data

| | | | |
|---|---|---|---|
| Jul. 6, 1993 | [JP] | Japan | 5-166998 |
| Jul. 6, 1993 | [JP] | Japan | 5-167002 |
| Aug. 3, 1993 | [JP] | Japan | 5-192344 |
| Aug. 20, 1993 | [JP] | Japan | 5-206171 |
| Aug. 23, 1993 | [JP] | Japan | 5-207418 |

[51] Int. Cl.$^6$ .............................................. H02P 5/28
[52] U.S. Cl. ............................................ 318/811; 318/802; 318/432
[58] Field of Search ................. 318/798–812, 318/727–732, 434, 139

[56] References Cited

U.S. PATENT DOCUMENTS

| | | | |
|---|---|---|---|
| 4,023,083 | 5/1977 | Plunkett | 318/802 |
| 4,044,285 | 8/1977 | Plunkett et al. | 318/803 |
| 4,243,927 | 1/1981 | D'Atre | 318/803 |
| 4,459,534 | 7/1984 | Nagase et al. | 318/803 X |
| 5,168,204 | 12/1992 | Schauder | 318/803 X |
| 5,212,438 | 5/1993 | Miyazaki et al. | 318/805 |

FOREIGN PATENT DOCUMENTS

| | | |
|---|---|---|
| 61-121783 | 6/1986 | Japan. |
| 2-23085 | 1/1990 | Japan. |

*Primary Examiner*—David S. Martin
*Attorney, Agent, or Firm*—Lowe, Price, LeBlanc & Becker

[57] ABSTRACT

A system and method for controlling an induction motor which basically achieve reductions in a steady state loss and in a transient loss of the induction motor such as a stepwise input of a torque instruction value $T_e^*$. Basically, a steady-state loss minimization magnetic flux calculating section calculates a secondary (rotor) magnetic flux $\phi_r^*$ which minimizes the steady-state loss of the induction motor in response to a torque instruction value. A target magnetic flux $\phi_r$ and a differentiation of the target magnetic flux $d\phi_r/dt$ are thereafter calculated using a low pass filter transfer function such as $\phi_r = \phi_r^* \cdot 1/(1+\tau_\phi.S)$(, wherein $\tau_\phi$ denotes a time constant, and S denotes a Laplace operator). A target torque $T_m$ is calculates using a predetermined transfer function in response to the torque instruction value such as $T_m = T_e^* \cdot 1/(1+\tau_T.S)$(, wherein $\tau_T$ is a time constant for the target torque). At the steady state, the slip frequency $\omega_{se}$ is set to a loss minimization slip frequency $\omega_{se\text{-}opt}$ and, at the transient state, a magnetic flux response gives an optimum value corresponding to a torque response described above. The induction motor is used to drive an electric motor-driven vehicle.

40 Claims, 21 Drawing Sheets

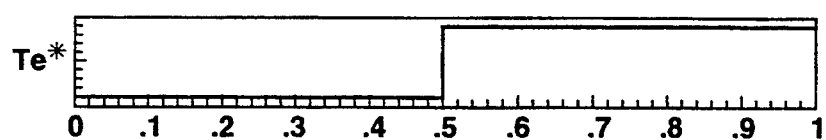
FIG.9A $T_e^*$
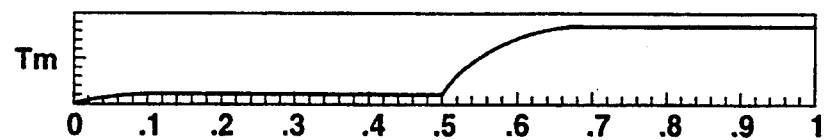
FIG.9B $T_m$
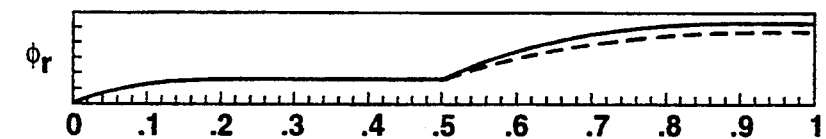
FIG.9C $\phi_r$
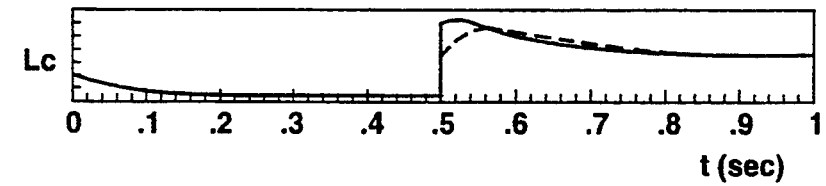
FIG.9D $L_c$
t (sec)

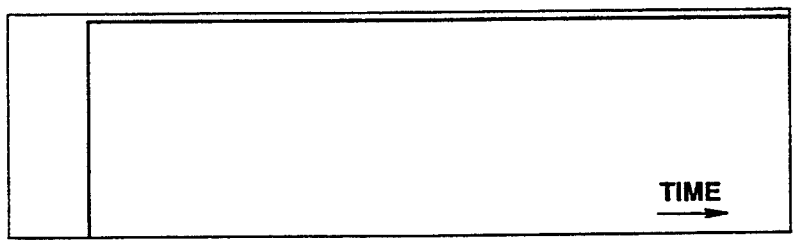
FIG.14A Te*
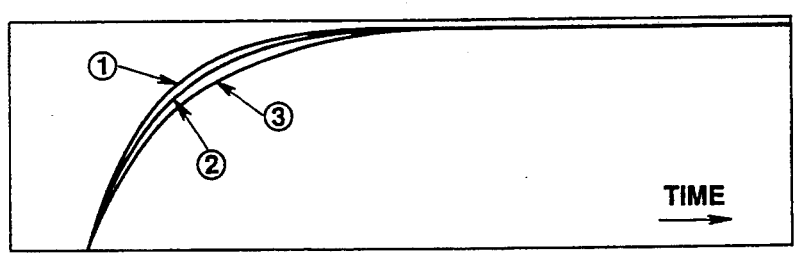
FIG.14B Tm
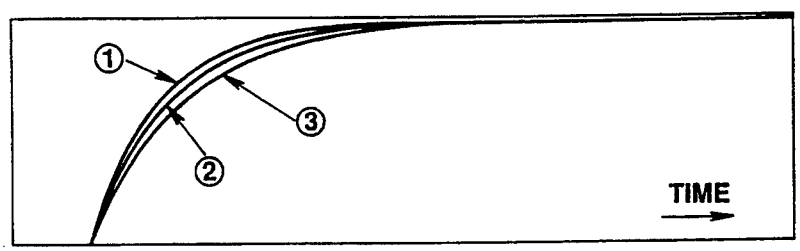
FIG.14C φr
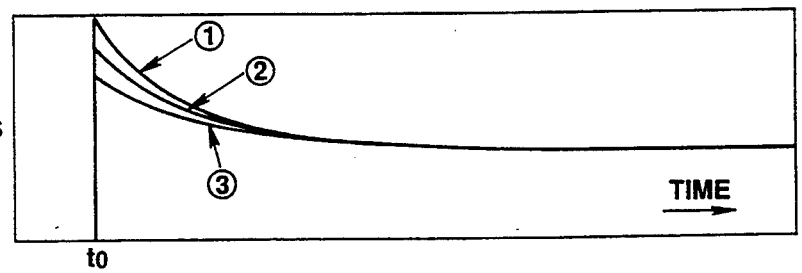
FIG.14D LOSS

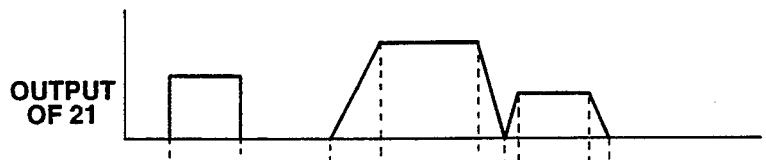
FIG.18A OUTPUT OF 21
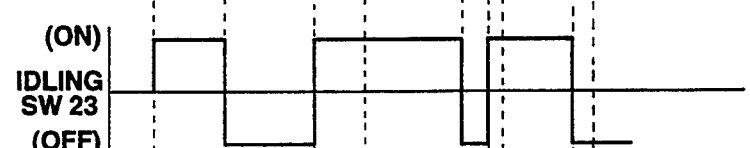
FIG.18B IDLING SW 23 (ON)/(OFF)
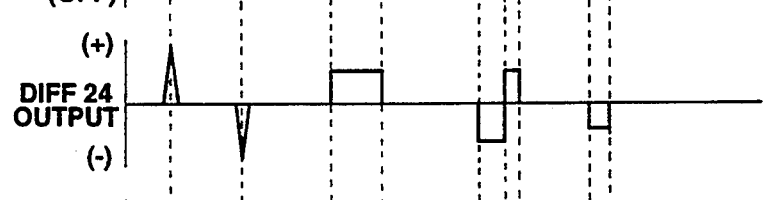
FIG.18C DIFF 24 OUTPUT (+)/(−)
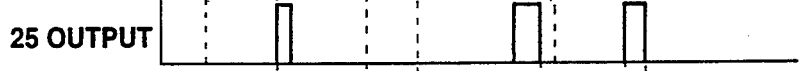
FIG.18D 25 OUTPUT
FIG.18E COMP 27 OUTPUT
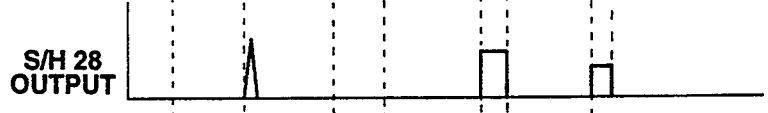
FIG.18F S/H 28 OUTPUT
FIG.18G Cs (OUTPUT OF 28)
RESET   RESET   RESET
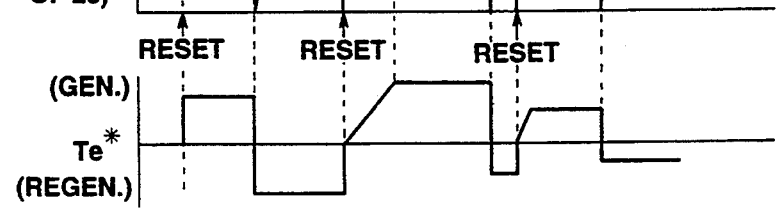
FIG.18H Te* (GEN.)/(REGEN.)

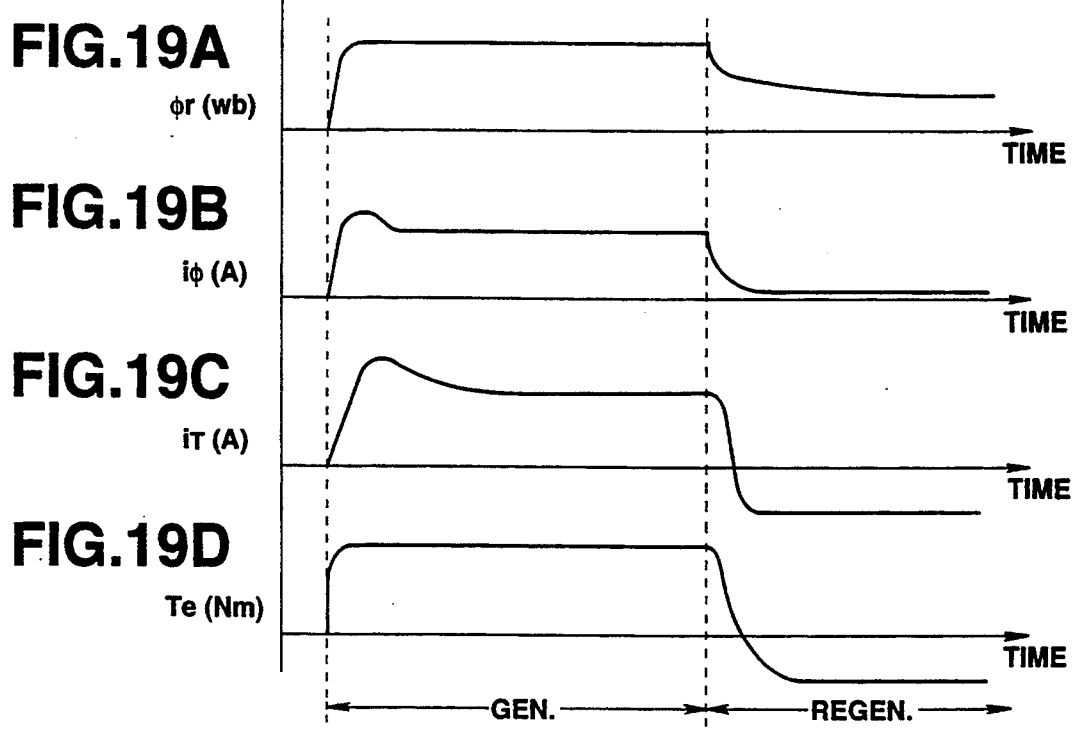

SYSTEM AND METHOD FOR CONTROLLING INDUCTION MOTOR APPLICABLE TO ELECTRIC MOTOR-DRIVEN VEHICLE

BACKGROUND OF THE INVENTION (1) Field of the invention

The present invention relates to system and method for controlling an induction motor which is, for example, used for an electric motor-driven vehicle and which achieves a high efficiency drive of the induction motor.

(2) Description of the background art

A Japanese Patent Application First (unexamined) Publication No. Showa 61-121783 published on Jun. 6, 1986 exemplifies a system for controlling an (AC, squirrel-cage) induction motor applied to an electric (motor-driven) vehicle in which a power regenerated by driving the induction motor from a load during a braking of the electric vehicle is returned to its power supply of the motor (regeneration).

The control system disclosed in the above-identified Japanese Patent Application First Publication includes means for generating an instruction signal of a slip frequency and means for calculating a current instruction value to drive the induction motor on the basis of the instruction signal of the slip frequency. In the control system described above, different target values of the instruction signal of the slip frequency are generated during a power drive state in which the load is driven from the induction motor and during a regenerative state in which the induction motor, in turn, is driven from the load so that a transition from the power drive state to the regenerative state can slowly be carried out. Consequently, the system can prevent an abrupt torque variation from being generated during the transition.

For example, suppose that a rotor magnetic flux of the motor is denoted by $\omega_r$, a torque current instruction value is denoted by $i_T$, an output torque of the motor is denoted by $T_e$, the slip frequency is denoted by $\omega_{se}$, the power supply frequency is denoted by $\omega$, a motor revolution number per time (electric angle) is denoted by $\omega_{re}$, and constant numbers are denoted by $k_1$ and $k_2$.

Then, the following equations are established:

$$\omega_{se} = \omega - \omega_{re} = k_1 \cdot i_T / \phi_r$$

$$T_e = k_2 \cdot \phi_r \cdot i_T.$$

As appreciated from the above equations, a desired regenerative torque is generated by varying the torque current instruction value $i_T$ with the magnetic flux $\phi$ as constant in a case when the instruction value of the slip frequency $\omega_{se}$ is given in the above equations. In this way, the torque control of the disclosed system is carried out by specifying the slip frequency $\omega_{se}$.

In this way, the induction motor is driven according to the torque current instruction value determined corresponding to the slip frequency instruction signal set irrespective of an energy loss (efficiency).

On the other hand, another Japanese Patent Application First Publication No. Heisei 2-23085 published on Jan. 25, 1990 (hereinafter referred to as reference A) exemplifies a control method for the induction motor.

In the reference A, an iron loss resistance $R_M$ is newly added to a d-axis component of an induction motor model expressed in a d-q coordinate system so as to describe a loss in the induction motor (iron loss, copper loss). Then, the induction motor is driven so as to minimize these losses in a steady state.

Specifically, a generally known vector control is used to control the torque of the induction motor according to the slip frequency $\omega_{se}$ derived from a condition of minimization of the steady-state loss. Since the iron loss resistance $R_M$ is varied according to a motor revolution speed, the slip frequency $\omega_{se-opt}$ which minimizes the loss can be derived by reading a table map of the iron loss resistance $R_M$ from the motor revolution speed and by solving an equation describing the condition of minimization of such a loss as described above.

However, in the induction motor control method disclosed in the reference A, since the condition of minimization of loss is derived from a steady-state characteristic of the motor and no consideration of a transient characteristic of the motor is given thereto, the loss of the motor torque during a time of transient response is not minimized.

SUMMARY OF THE INVENTION

It is, therefore, a main object of the present invention to provide a system and method for controlling an induction motor applicable to an electric motor-driven vehicle in which a steady-state loss of a motor torque can not only be reduced but also a transient loss of the motor torque can be reduced.

It is further object of the present invention to provide the system and method for controlling the induction motor applicable to the electric motor-driven vehicle in which the transient loss can be reduced together with an avoidance of an abrupt torque variation during the transition from the power drive state to the regenerative state.

The above-described objects can be achieved by providing a system for controlling an induction motor, comprising: a) steady-state loss minimization magnetic flux calculating means for calculating a rotor magnetic flux which minimizes a steady-state loss of the induction motor in response to a torque instruction value; b) target magnetic flux calculating means for receiving the steady-state loss minimization magnetic flux and for calculating a target magnetic flux and a first-order differentiated value of the target magnetic flux on the basis of a transfer function having a low pass filter characteristic; c) target torque calculating means for calculating a target torque of the induction motor on the basis of a predetermined transfer function in response to the torque instruction value; d) means for detecting a revolution speed of the induction motor; e) vector control calculating means for calculating a current instruction value on the basis of various circuit constants of an equivalent circuit of the motor and according to the calculated target magnetic flux, the first-order differentiated value of the target magnetic flux, the calculated target torque, and revolution speed of the motor; and f) motor drive means for following up a current passing through the induction motor to the current instruction value so as to drive the induction motor, so that an output torque of the induction motor has a value corresponding to the target torque.

The above-described objects can also be achieved by providing a system for controlling an induction motor applicable to an electric motor-driven vehicle, comprising: a) a steady-state copper loss minimization magnetic flux calculating section which calculates a rotor magnetic flux $\phi_r^*$ which minimizes a steady-state copper loss of the motor in the steady state in response to a torque instruction value $T_e^*$ as follows:

$$\phi_r^* = \sqrt{(R_r \cdot T_e^*/(P \cdot \omega_{se\text{-}opt}))},$$

wherein $\omega_{se\text{-}opt} = \sqrt{(R_s \cdot R_r^2)/(R_s \cdot L_r^2 + R_r \cdot M^2)}$, wherein $\omega_{se\text{-}opt}$ denotes a slip frequency of the motor which minimizes the copper loss $L_c$ at the steady state which is defined as $d\phi_r/dt = 0$, $R_s$ denotes a stator resistance, $R_r$ denotes a rotor resistance, $L_r$ denotes a rotor self-inductance, and M denotes a mutual inductance between the starer and rotor, and P denotes a number of mutually opposing N-S pole numbers of the motor which is half the total number of N and S poles; b) a target magnetic flux calculating section which receives said steady-state copper loss minimization magnetic flux $\phi_r^*$ from said steady-state copper loss minimization magnetic flux calculating section and calculates the target magnetic flux $\phi_r$ and its first-order differentiated value $d\phi_r/dt$ using the following equation:

$$\phi_r = \frac{1}{1 + \tau_\phi \cdot S} \phi_r^*,$$

wherein $\tau_\phi$ denotes a time constant of the target magnetic flux $\phi_r$ and S denotes a Laplace operator; c) a target torque calculating section which calculates a target torque $T_m$ in response to the received torque instruction value $T_e^*$ as follows:

$$T_m = \frac{1}{1 + \tau_T \cdot S} T_e^*,$$

wherein $\tau_T$ denotes a time constant of the target torque $T_m$; d) a vector control calculating section which receives the target magnetic flux $\phi_r$, its first-order differentiated value, and target torque, and a motor revolution speed and calculates an instruction value of an excitation current $i_\phi^*$ and an instruction value of a torque current $i_T^*$ as follows:

$i_T^* = L_r(\omega_{se\text{-}opt}) \cdot \phi_r/(M \cdot R_r)$, $i_\phi^* = (1/M) \cdot \phi_r + L_r/(M \cdot R_r) \cdot d\phi_r/dt;$ e) means for calculating a motor revolution frequency $\omega_{re}$ from a motor revolution speed N detected by means of a speed sensor attached about an output axle of the induction motor, adding the motor revolution frequency to the slip frequency $\omega_{se\text{-}opt}$ to derive a motor power supply frequency $\omega$, and integrating the power supply frequency $\omega$ to derive an electrical angle $\theta$; f) coordinate converting section which receives the instruction values of $i_\phi^*$ and $i_T^*$ and electrical angle $\theta$ to convert them into three-phase current value $i_u^*$, $i_v^*$, and $i_w$; and g) means for driving the induction motor so as to make currents flowing through the induction motor follow up said current instruction values.

The above-described objects can also be achieved by providing a method for controlling an induction motor, comprising the steps of: a) calculating a rotor magnetic flux which minimizes a steady-state loss of the induction motor in response to a torque instruction value; b) receiving the steady-state loss minimization magnetic flux and calculating a target magnetic flux and a first-order differentiated value of the target magnetic flux on the basis of a transfer function having a low pass filter characteristic; c) calculating a target torque of the induction motor on the basis of a predetermined transfer function in response to the torque instruction value; d) detecting a revolution speed of the induction motor; e) calculating a current instruction value on the basis of various circuit constants of an equivalent circuit of the motor and according to the calculated target magnetic flux, the first-order differentiated value of the target magnetic flux, the calculated target torque, and revolution speed of the motor; and f) following up a current passing through the induction motor to the current instruction value so as to drive the induction motor, so that an output torque of the induction motor has a value corresponding to the target torque.

As a basic concept of the present invention, calculations portions of the steady-state loss minimization magnetic flux which minimizes the loss of the induction motor in the steady state, the target magnetic flux and target torque are added to the normal vector control so apparatus so that the control system which can independently control the torque response characteristic and magnetic flux response characteristic. Therefore, at the steady state, the slip frequency is maintained at the loss minimization slip frequency. At the transient state, the magnetic response provides an optimum value according to the torque response so that the transient loss of the motor can be reduced. Thus, without sacrifice of the response characteristic, the transient loss can be reduced. In addition, the motor can be driven with the same minimum loss, at the steady state.

BRIEF DESCRIPTION OF THE DRAWINGS

FIGS. 9A through 9D are characteristic graphs representing results of the motor speed control simulation when a fixed value of the time constant $\tau_\phi$ which minimizes the loss is used and when a value of the time constant $\tau_\phi$ is varied according to a target magnetic flux $\phi_r$ so as to minimize the loss.

FIGS. 14A through 14D are characteristic graphs representing changes in a torque target value Tm, magnetic flux time constant $\tau_\phi$, and loss when the time constant $\tau_T$ of the target torque and time constant $\tau_\phi$ are changed.

FIGS. 18A through 18H are signal waveform charts in the torque instruction value generating section 9 shown in FIG. 15.

FIGS. 19A through 19D are characteristic graphs representing dynamic characteristics when the induction motor is transferred from a power drive state to a regenerative state in the fourth embodiment shown in FIGS. 15 through 17.

DETAILED DESCRIPTION OF THE PREFERRED EMBODIMENTS

Reference will, hereinafter, be made to the drawings in order to facilitate a better understanding of the present invention.

(First embodiment)

Figure 1:
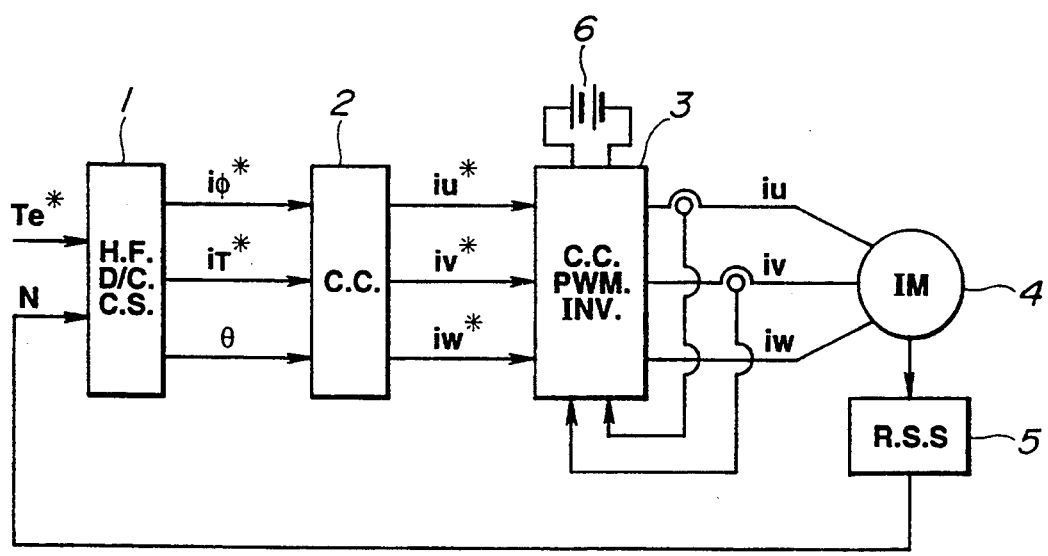
FIG. 1 is a schematic circuit block diagram of a whole system for controlling an induction motor in a first preferred embodiment according to the present invention.
Figure 2:
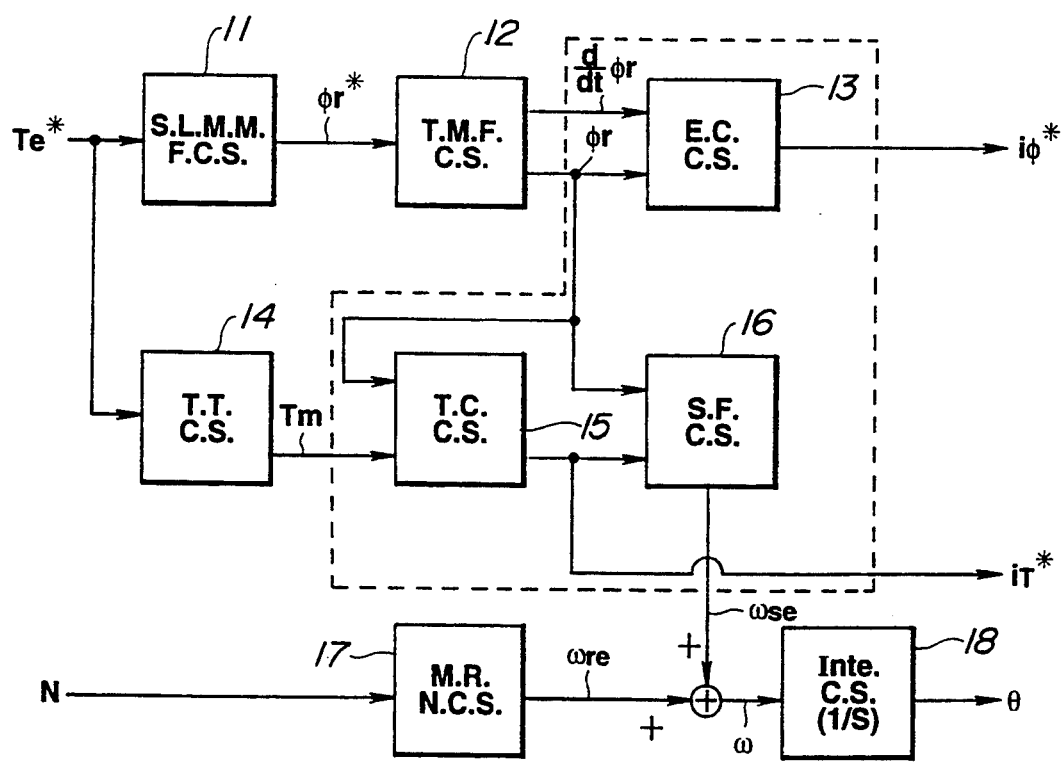
FIG. 2 is a circuit functional block diagram of a high efficiency drive/control calculating section (H. F. D/C. C. S.) shown in FIG. 1.

FIGS. 1 and 2 show a first preferred embodiment of a system for controlling an induction motor according to the present invention.

In FIG. 1, a high efficiency drive/control calculating section (H. E. D/C. C. S.) 1 is provided, for example, for receiving a torque instruction value $T_e^*$ corresponding to an operating variable such as a depression force acted upon an accelerator pedal of an electric motor-driven vehicle and a motor revolution speed N (in rpm (revolutions per minute) detected by a revolution speed sensor (pp, or R. S. S.) 5 and for calculating and outputting an excitation current instruction value $i_\phi^*$ to generate a rotating magnetic flux of the motor, a torque current instruction value $i_T^*$ to generate a motor output torque, and phase angle $\theta$ between the currents as will be described later.

In FIG. 1, a coordinate converter (C, C.) 2 converts the above-described excitation current instruction value $i_\phi^*$, torque current instruction value $i_T^*$ and the current phase angle $\theta$ calculated in a coordinate system rotating with a power supply frequency $\omega$ of the motor 4 into a three-phase alternating current instruction values $i_u^*$, $i_v^*$, and $i_w^*$. In addition a current control type PWM (Pulse Width Modulation) inverter 3 is provided so that the three-phase AC currents $i_u$, $i_v$, and $i_w$ flowing through the motor approach their instruction values $i_u^*$, $i_v^*$, and $i_w^*$. A revolution speed of the motor (output axle) is detected by means of the revolution speed sensor (R. S. S. ) 5. In addition, a DC power supply 6 is provided for supplying a DC power to the PWM inverter 3 to drive the motor 4 via the PWM inverter 3.

The motor 4 is made of, for example, a squirrel-cage induction motor.

Next, in the high efficiency drive/control calculating section 1 of FIG. 2, a steady-state loss minimization magnetic flux calculating section (S. L. M. M. F. C. S.) 11, a target magnetic flux calculating section (T. M. F. C. S.) 12, an exciting current calculating section (E. C. C. S.) 13, a target torque calculating section (T. T. C. S.) 14, a torque current calculating section (T. C. C. S.) 15, a slip (angular) frequency calculating section (S. F. C. S.) 16, a motor revolution speed calculating section (M. R. S. C. S.) 17, and an integration calculating section (Inte. C. S.) 18 are provided. It is noted that the excitation current calculating section 13, torque current calculating section 15, the slip frequency calculating section 16, and integration calculating section 18 are sections which carries out a generally known vector control.

Next, an operation in the first embodiment of the motor control system will be described below with reference to FIGS. 2 and 3.

First, a general operation of each calculating section will be described and an essential part of a feature in the first embodiment will follow.

In FIG. 2, the steady-state loss minimization magnetic flux calculating section 11 receives the torque instruction value $T_e^*$, calculates a secondary (rotor) magnetic flux $\phi_r^*$ which minimizes a loss (copper loss or resistance loss) in a motor steady state on the basis of the torque instruction value $T_e^*$ and outputs the magnetic flux value of $\phi_r^*$.

The target magnetic flux calculating section 12 receives the above-calculated steady-state minimization magnetic flux $\phi_r^*$, calculates a target magnetic flux $\phi_r$ which corresponds to the above-described steady-state loss minimization loss magnetic flux $\phi_r^*$ in the steady state and which provides an optimum value such that a magnetic flux response accords to a torque response in the transient state and its first-order differential value $d\phi_r/dt$, and outputs both values of $\phi_r$ and $d\phi_r/dt$.

The target torque calculating section 14 receives the torque instruction value $T_e^*$ and calculates a target torque $T_m$ on the basis of a predetermined transfer characteristic (this transfer characteristic is set according to a required response characteristic and allowed current capacity and so forth).

The excitation current calculating section 13, torque current calculating section 15, and the slip frequency calculating section 16 carry out the generally known vector control calculation.

In details, the excitation current calculating section 13 calculates and outputs the excitation current instruction value $i_\phi^*$ on the basis of the target magnetic flux $\phi_r$ and $d\phi_r/dt$ received from the target magnetic flux calculating section 12. The torque current calculating section 15 receives the target torque $T_m$ of the target torque calculating section 14 and target magnetic flux $\phi_r$ of the target magnetic flux calculating section 12 and calculates and outputs the torque current instruction value $i_T^*$. In addition, the slip frequency calculating section 16 receives the target magnetic flux $\phi_r$ of the target magnetic flux calculating section 12 and torque current calculating section 15 and calculates and outputs the slip frequency $\omega_{se}$.

Furthermore, the motor revolution speed calculating section 17 calculates a motor revolution per minute (electrical angle) $\omega_{re}$ by multiplying the revolution speed of the motor N derived from the revolution speed sensor 5 of FIG. 1 with a number of mutually opposing poles P (half a standard number of N and S poles of the motor) determined inherently in the motor used; namely, $\omega_{re}=(\pi/30)N.P$.

It is noted that an addition of the motor revolution speed $\xi_{re}$ to the above-described slip frequency $\omega_{se}$ gives the power supply frequency $\omega$; namely, $\omega=\omega_{se}+\omega_{re}$. The integration calculating section (1/S, S denotes a Laplace operator) 18 outputs an integrated value of the power supply frequency $\omega$ as the current phase angle $\theta$.

Then, the excitation current instruction value $i_\phi^*$, the torque current instruction value $i_T$, and current phase angle $\theta$ are supplied to the coordinate converter 2 of FIG. 1 as instruction values.

Next, the detailed explanations of operations in the respective calculating sections shown in FIG. 2 will be made below.

The sections of the excitation current calculating section 13, torque current calculating section 15, and slip frequency calculating section 16 execute the generally known vector control.

Figure 3:
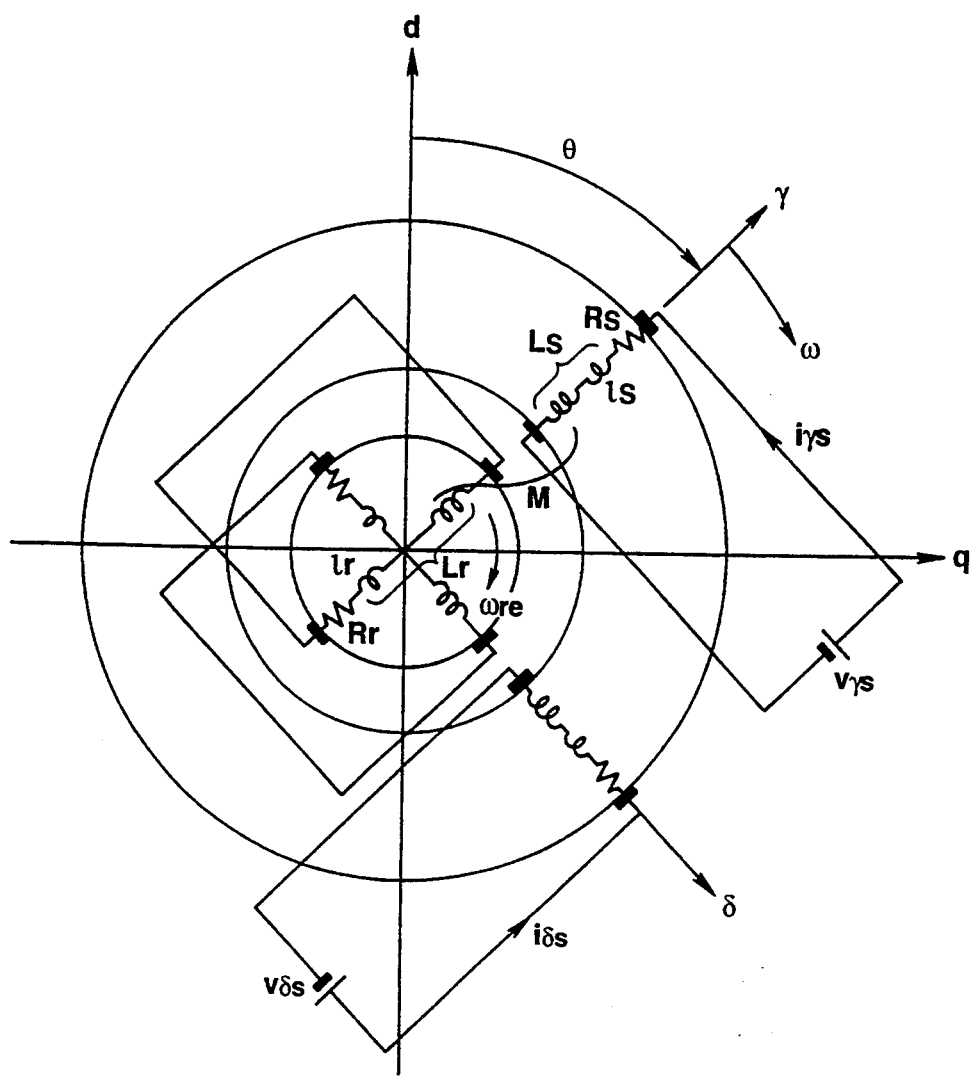
FIG. 3 is a model view of the induction motor shown in FIG. 1 in a rotating $\gamma$-$\delta$ Cartesian coordinate system.

For example, from an equivalent circuit of the squirrel cage induction motor 4 in a $\gamma$-$\delta$ coordinate system as shown in FIG. 3, the following matrix formula (1a) is established:

$$\frac{d}{dt}\begin{bmatrix} i_{\gamma s} \\ i_{\delta s} \\ \phi_{\gamma r} \\ \phi_{\delta r} \end{bmatrix} = \begin{bmatrix} -\frac{R_s}{\sigma L_s}-\frac{R_r(1-\sigma)}{\sigma L_r} & \omega & \frac{MR_r}{\sigma L_s L_r^2} & \frac{\omega_{re}M}{\sigma L_s L_r} \\ -\omega & -\frac{R_s}{\sigma L_s}-\frac{R_r(1-\sigma)}{\sigma L_r} & -\frac{\omega_{re}M}{\sigma L_s L_r} & \frac{MR_r}{\sigma L_s L_r^2} \\ \frac{MR_r}{L_r} & 0 & -\frac{R_r}{L_r} & (\omega-\omega_{re}) \\ 0 & \frac{MR_r}{L_r} & -(\omega-\omega_{re}) & -\frac{R_r}{L_r} \end{bmatrix}\begin{bmatrix} i_{\gamma s} \\ i_{\delta s} \\ \phi_{\gamma r} \\ \phi_{\delta r} \end{bmatrix} + \frac{1}{\sigma L_s}\begin{bmatrix} v_{\gamma s} \\ v_{\delta s} \\ 0 \\ 0 \end{bmatrix} \quad (1a)$$

provided that $\sigma=1-M^2/L_s L_r$.

In addition, the following matrix formula (1b) is established:

$$\begin{bmatrix} \phi_{\gamma s} \\ \phi_{\delta s} \\ \phi_{\gamma r} \\ \phi_{\delta r} \end{bmatrix} = \begin{bmatrix} L_s & 0 & M & 0 \\ 0 & L_s & 0 & M \\ M & 0 & L_r & 0 \\ 0 & M & 0 & L_r \end{bmatrix}\begin{bmatrix} i_{\gamma s} \\ i_{\delta s} \\ i_{\gamma r} \\ i_{\delta r} \end{bmatrix} \quad (1b)$$

Furthermore, $$T_e = P \cdot M/L_r \cdot (i_{\delta s}\phi_{\gamma r}-i_{\gamma s}\phi_{\delta r}) \quad (1c)$$

In the above-expressed formulae, M denotes a mutual inductance between the stator (subscript s) and a rotor (subscript r), L denotes a self-inductance, R denotes a resistor, $\omega_{re}$ denotes the motor axle revolution per minute (also called rotor angular velocity (electrical angle)), i denotes a current, v denotes a voltage, and $\phi$ denotes a magnetic flux.

As appreciated from the equation (1c), the torque of the induction motor takes a form of mutually interfering the stator current $i_s$ and rotor magnetic flux $\phi_r$ in the $\gamma$-$\delta$ axis with each other. Then, to simplify the torque control, suppose that the $\delta$-axis rotor magnetic flux $\phi_{\delta r}$ gives zero.

Now, when rearranging the third and fourth lines of the matrix formula of (1a), the following equations (1d, e) are established:

$$\frac{d}{dt}\phi_{\gamma r} = -\frac{R_r}{L_r}\phi_{\gamma r} + \omega_{34}\phi_{\delta r} + \frac{MR_r}{L_r}i_{\gamma s} \quad (1d)$$

$$\frac{d}{dt}\phi_{\delta r} = -\frac{R_r}{L_r}\phi_{\delta r} - \omega_{34}\phi_{\gamma r} + \frac{MR_r}{L_r}i_{\delta s} \quad (1e)$$

When furthermore rearranging the equation (1e), the following equation (1f) is established:

$$\phi_{\delta r} = \frac{1}{s+\frac{R_r}{L_r}}\left(-\omega_{34}\phi_{\gamma r} + \frac{MR_r}{L_r}i_{\delta s}\right), \quad (1f)$$

(1f),
provided that S denotes a Laplace operator ($S=\sigma+j\omega$, $\sigma$ (usually=0) and $\omega$ are different from those symbols of the power supply frequency and in the equation (1a)).

In order to give zero to the $\phi_{\delta r}$, the slip frequency $\omega_{se}$ may be controlled as follows:

$$\begin{aligned}\omega_{se} &= \omega - \omega_{re} \\ &= (M \cdot R_r/L_r) \cdot (i_T)/\phi_r,\end{aligned} \quad (1)$$

wherein $i_T=i_{\delta s}$ and $\phi_r=\phi_r$.

In addition, the motor torque $T_e$ can be expressed as:
$$T_e=(P \cdot M/L_r)\phi_r i_T \quad (2)$$

At this time, the relationship between the rotor (secondary) magnetic flux $\phi_r$ ($=\phi_{\delta r}$) and the excitation current iys is given by Laplace transforming the equation (1d):

$$\phi_r = M \cdot (R_r/L_r)/(S + R_r/L_r) \cdot i_{ys} \quad (3).$$

Hence, the calculation formula of the excitation current instruction value $i_\phi^*$ carried out in the excitation current calculating section 13 is as follows from the equation (3) expressing therein predetermined circuit constants of an equivalent circuit of the induction motor:

$$i_\phi = (1/M)\phi_r + L_r/(M \cdot R_r) \cdot d\phi_r/dt \quad (4).$$

The calculation formula of the torque current instruction value $i_T^*$ carried out in the torque current calculating section 15 is given as follows from the equation (2) expressing therein predetermined circuit constants of an equivalent circuit of the induction motor:

$$i_T^* = L_r/(P \cdot M) \cdot T_e^*/\phi_r \quad (5).$$

The calculation formula of the slip frequency calculating section 16 is shown in the equation (1).

The calculation formula of both the revolution number per minute calculating section 17 and integration calculating section 18 has been described in the equation (1).

Next, the steady-state loss minimization magnetic flux calculating section 11 and target magnetic flux calculating section, and target torque calculating section 14 will be described below.

In the generally known vector control, with the rotor (secondary) magnetic flux $\phi_r$ constant (excitation current $i_\phi$ is constant), only the torque current $i_T$ is varied so as to obtain a linearity and quick response characteristic of an output torque of the motor 4 to the torque current $i_T$.

However, since the vector control such that the rotor magnetic flux $\phi_r$ is constant supplies the constant excitation current $i_\phi$ irrespective of the motor load, an efficiency of power is generally worsened (power loss is increased) at a light load applied to the motor 4.

Therefore, the copper loss is adopted as the loss of the induction motor 4 and a condition under which the loss is minimized is derived.

That is to say, FIG. 3 shows the equivalent circuit of the induction motor in the $\gamma$-$\delta$ coordinate system rotating with the power supply frequency $\omega$.

From the equation of the slip frequency of (1), $i_{\delta s}$ is established as follows:

$$i_{\delta s} = \omega_{se} \cdot L_r \phi_r/(M \cdot R_r) \quad (6.1).$$

From the matrix formula (fourth line) of (1b) and the condition of the vector control, namely, $\phi_{\delta r} = 0$, the following $i_{\delta r}$ is established as follows:

$$i_{\delta r} = \omega_{se} \cdot (1/R_r) \cdot \phi_r \quad (6.2).$$

In addition, from the equation (1d) and the condition of $\phi_{\delta r}=0$, the following $i_{\delta s}$ is established as:

$$i_{\gamma s} = 1/M \, (\phi_{\gamma r} + \tau_r d\phi_{\gamma r}/dt) \quad (6.3).$$

From the equation of (1b), namely, $\phi_{\delta r} = M \cdot i_{\delta s} + L_r i_{\delta r}$, the following $i_{\delta r}$ is established:

$$i_{\gamma r} = (-1/R_r) d\phi_{\gamma r}/dt \quad (6.4).$$

As expressed in the equations of (6.1) through (6.4), all primary (stator) and secondary (rotor) currents are expressed using $\delta$-axis secondary (rotor) magnetic flux $\phi_{\delta r}$ ($=\phi_r$).

On the other hand, the resistance loss, namely, the copper loss of the inductor motor denoted by $L_c$ is established from the equivalent circuit of FIG. 3 and the equations of (6.1) through (6.4) as:

$$\begin{aligned} L_c &= (i_{\gamma s}^2 + i_{\delta s}^2) R_s + (i_{\gamma r}^2 + i_{\delta r}^2) R_r \\ &= T_e^2/P[(1 + R_s L_r^2/(R_r^2 M^2))\omega_{se} + \\ &\quad R_s R_r/M^2 \cdot 1/\omega_{se}] + \\ &\quad [K_1 \cdot (d\phi_r/dt)^2 + K_2 \cdot \phi_r \cdot d\phi_r]/dt. \end{aligned} \quad (7)$$

In the equation of (7), $R_s$ denotes the stator resistance and $R_r$ denotes the rotor resistance, $K_1$ denotes $(R_s \cdot L_r^2/(R_r^2 M^2) + 1/R_r)$ and $K_2$ denotes $2R_s \cdot L_r/(R_r \cdot M^2)$.

When considering the steady state of the motor, the items of the differential parts of the equation (7) should be zero. Hence, the slip frequency to minimize the steady state copper loss can be derived from the following equation since $dL_c/d\omega_{se} = 0$.

$$\omega_{se\text{-}opt} = \sqrt{(R_s R_r^2/(R_s L_r^2 + R_r M^2))} \quad (8)$$

From the equation (8), the slip frequency to minimize the copper loss in the steady state is constant irrespective of the operation state of the motor. Specifically, from the equation (1), the relationship between the torque current $i_T$ ($i_{\delta s}$) and secondary magnetic Flux $\phi_r$ ($\phi_{\delta r}$) may be established in order to maintain the slip frequency at the optimum slip frequency of minimization of the copper loss as:

$$\phi_r = 1/\omega_{se\text{-}opt} (M \cdot R_r/L_r) \cdot i_T \quad (9)$$

$$(i_{\delta s} = L_r \phi_r \omega_{se\text{-}opt}/(M \cdot R_r)) \quad (9')$$

If the equation of (9) is substituted into the equation (2) to eliminate $i_T$, the relationship between the torque instruction value $T_e^*$ and secondary magnetic flux $\phi_r$ is expressed as:

$$\phi_r = \sqrt{(R_r T_e^*/(P \cdot \omega_{se\text{-}opt}))} \quad (10).$$

Hence, if the torque instruction value $T_e$ is input as shown in FIG. 2, the steady state loss minimization magnetic flux $\phi_r^*$ is derived from the equation of (10) the torque current instruction value $i_T^*$ is calculated from the equation (9), the excitation current instruction value $i_\phi^*$ is calculated from the equation (4), and the slip frequency $\omega_{se}$ is calculated from the equation (1), respectively, so that it is possible to drive the motor so as to steadily minimize the copper loss.

At this time, the slip (angular) frequency $\omega_{se}$ is coincident with the loss minimization slip frequency of $\omega_{se\text{-}opt}$ and the output torque $T_e$ follows the torque instruction value $T_e^*$.

However, suppose that the torque instruction value $T_e^*$ is changed in the stepwise (impulse) form. At this time, the steady state loss minimization magnetic flux $\phi_r^*$ is also changed in the stepwise form as appreciated from the equation (10). Since, as expressed in the equation (4), the calculation of the excitation current instruction value $i_\phi^*$ includes $d\phi_r/dt$, the excitation current instruction value $i_\phi^*$ becomes transiently larger, if the torque instruction value is changed in the stepwise form, so that a transient loss is increased.

The above-described phenomenon is appreciated from the equation (7) in which $L_c$ is a function of $d\phi_r/dt$.

In addition, in the first embodiment, the copper loss is considered as the loss. However, the same problem occurs in the consideration of both copper loss and iron loss as described in the reference A.

The reference A teaches that the optimum slip frequency $\omega_{se\text{-}min}$ ($\omega_{se\text{-}opt}$) to minimize the copper loss and iron loss in the induction motor is calculated as follows:

$$\omega_{se\text{-}min}=[(R_1+R_M)R_2^2/\{M^2R_2+R_1(L_2+\iota_2)^2\}]^{0.5},$$

wherein $R_1=R_s$, $R_2=R_r$, $R_M$ denotes an iron resistance, $L_2$ denotes a rotor (secondary) inductance, and $\iota_2$ denotes a secondary leakage inductance.

Hence, it is not a good practice for the slip frequency to be maintained at the optimum slip frequency defined as $\omega_{se\text{-}opt}$ which minimizes the loss at the steady state from the standpoint of the efficiency when the transient loss is also considered. In addition, in a case where semiconductor switching elements used in the current control type PWM inverter 3 have limited current carrying capacities so that an upper limited value of the flowing currents is determined, it is necessary to make the torque response slower when it is transient time in which the currents are large.

To cope with such a situation of transient time, the first embodiment of the motor controlling system adds the target torque calculating section 14, the steady-state loss minimization magnetic flux calculating section 11, and target magnetic flux calculating section 12, which determine the torque response to the generally known vector control calculating sections 13, 15, and 16 so that the control system in which the torque responsive characteristic and magnetic flux response characteristic can independently be varied is configured.

Thus, when the motor is in the steady state, the slip frequency is maintained at the optimum slip frequency $\omega_{se\text{-}opt}$ which minimizes the losses and when the motor is in the transient state, the magnetic response characteristic gives the optimum value corresponding to the torque response, thereby the transient loss being reduced.

In the first embodiment, the content of calculation carried out in the steady-state loss minimization magnetic flux calculating section 11 is expressed in the equation (10). That is to say, the steady-state loss minimization magnetic flux calculating section 11 calculates the steady-state loss minimization magnetic flux $\phi_r^*$, which is the rotor magnetic flux which steadily minimizes the losses.

In addition, the target magnetic flux calculating section 12 which calculates the target magnetic flux $\phi_r$ comprises a filter having a steady-state gain of 1.

In the first embodiment, the filter 12 comprises a first-order low pass filter expressed as follows:

$$\phi_r = \frac{1}{1 + \tau_\phi \cdot S} \phi_r^*. \tag{11}$$

In the equation (11), $\tau_\phi$ denotes a time constant of the target magnetic flux and S denotes the Laplace operator.

In addition, the target torque calculating section 14 which calculates the target torque $T_m$ has the transfer characteristic (function) as expressed in the following equation (12). The transfer characteristic (function) can appropriately be set according to the required response characteristic and current carrying capacity of the PWM inverter.

$$T_m = \frac{1}{1 + \tau_T \cdot S} T_e^*. \tag{12}$$

In the equation (12), $\tau_T$ denotes a time constant of the target torque, for example, a constant value.

Figure 4:
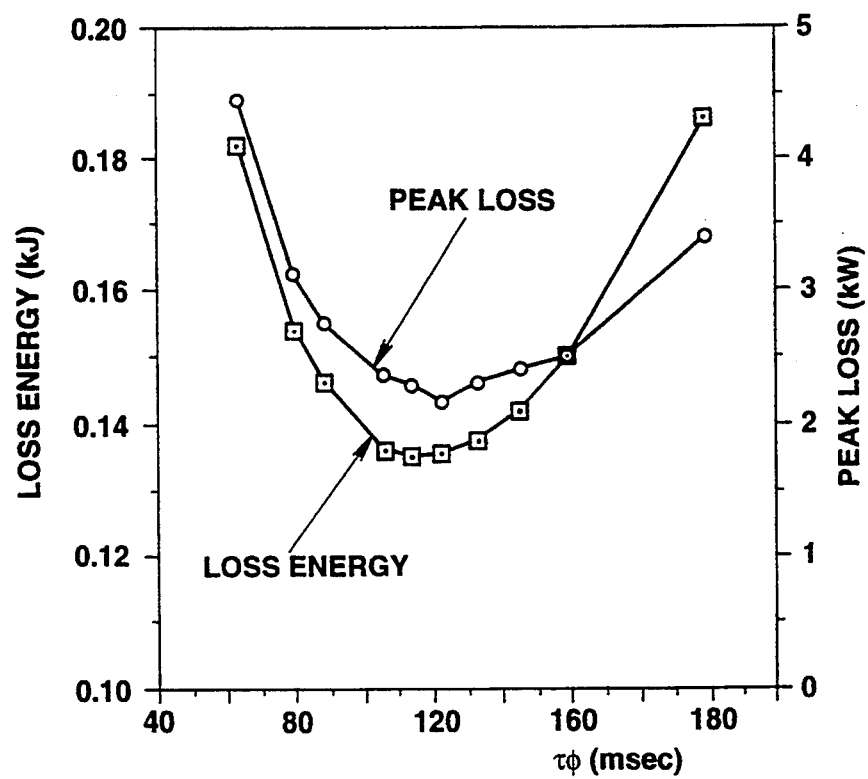
FIG. 4 is a characteristic graph representing a peak value of a loss in the induction motor and a calculated value of a loss energy within a certain time with respect to a time constant $\tau_\phi$ of a target magnetic flux when a change in a stepwise form of a torque instruction value $T_e^*$ is input to the high efficiency drive/control calculating section (H. F. D/C. C. S.) shown in FIG. 1 and FIG. 2.
Figure 5:
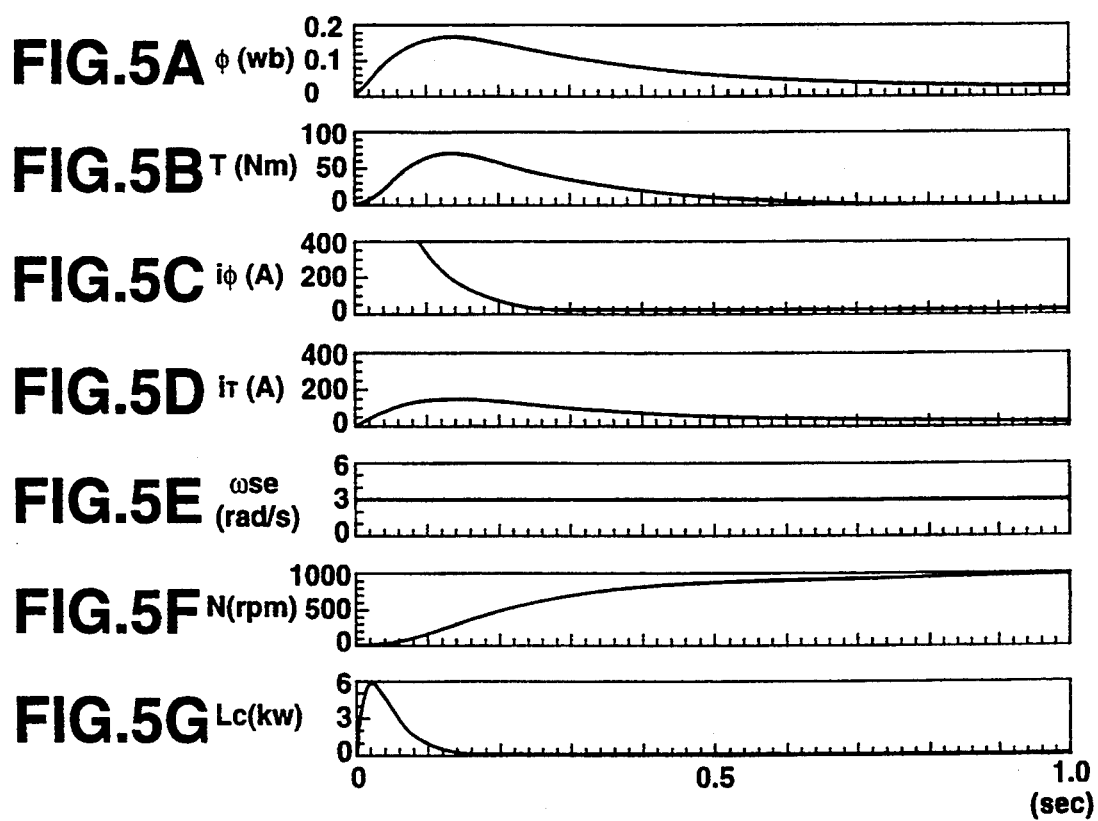
FIGS. 5A through 5G are characteristic graphs presenting results of a motor speed control simulation in the case of the reference A.
Figure 6:
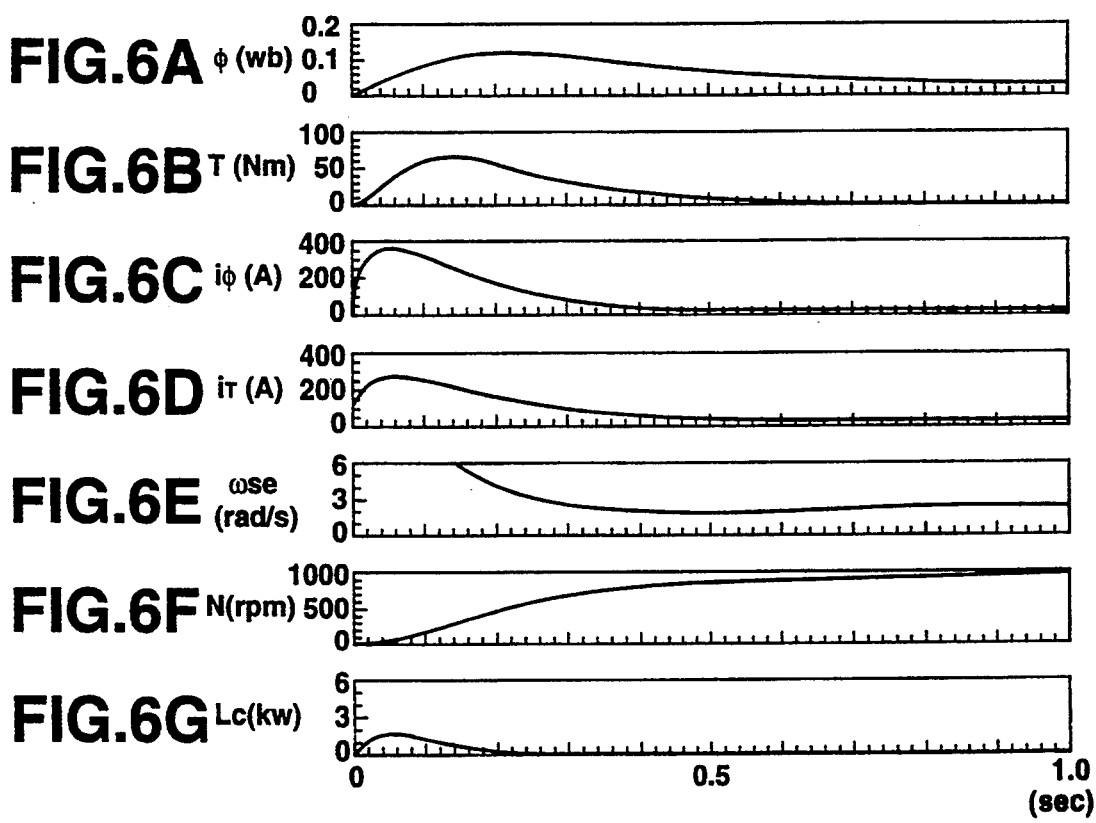
FIGS. 6A through 6G are characteristic graphs representing results of a motor speed control simulation in the case of the first embodiment shown in FIGS. 1 and 2.

FIG. 4 shows characteristic graphs representing the plotted peak values of the loss in the induction motor 4 with respect to the time constant $\tau_\phi$ and calculated values of the loss energy with a certain time in a case where the stepwise change of the torque instruction value so $T_e^*$ is input to the control system of FIG. 2.

As shown in FIG. 4, each loss of the peak values and calculated loss energy provides a characteristic having a minimum value and each loss gives the minimum value when the time constant $\tau_\phi$ gives the certain value.

Hence, in the control system shown in FIG. 2, when the torque characteristic is given as the equation (12) and if the magnetic response characteristic is determined using the target magnetic flux time constant $\tau_\phi$ which minimizes the loss at the transient state and is derived from FIG. 4, the motor drive such that the loss is reduced at both times of transient state and steady state becomes possible.

That is to say, the value of $\tau_\phi$ which minimizes the loss in the case of FIG. 4 may be used in the equation (12).

FIGS. 5A through 6G show characteristic graphs representing the results of speed control simulations.

Especially, FIGS. 5A through 5G show those when the slip frequency $\omega_{se}$ is maintained at the loss minimization slip frequency $\omega_{se\text{-}opt}$ both at the steady state and transient state and FIGS. 6A through 6G show those when the method in the first embodiment is used. It is noted that the torque response characteristics in the case of both FIGS. 5A through 5G and FIGS. 6A through 6G are mutually the same.

As shown in FIGS. 5B and 5F and FIGS. 6B and 6F, the torque response characteristics of the torque T (Nm) and revolution speed N (rpm) are mutually the same.

However, as shown in FIGS. 5G and 6G, for the copper loss characteristics of $L_c$, the first embodiment shown in FIG. 6G gives a more reduction of the copper loss $L_c$ than the case of FIG. 5G and, in the steady state, the motor is driven by the slip frequency which minimizes the copper loss in the same way as in the case of FIG. 5G.

Hence, in the first embodiment, the loss at the transient state can be reduced maintaining the same response characteristic to the torque variation.

Although, in the first embodiment, the magnetic flux response characteristic is given to the equation (11) and the torque response characteristic is given to the equation of (12), the transfer characteristics may not be limited.

For example, the torque response characteristic may be provided from a well known second-order vibration system generally denoted by $G(s)$ $(=\omega_n^2/(S^2+2\xi\omega_n S+\omega n^2))$ and the magnetic flux response characteristic may be provided from the second-order vibration system.

It is noted that to derive the first-order differentiated value of the target magnetic flux without the differential calculation, it is necessary to give a relative lo order between a numerator and denominator equal to one or more. In addition, in a case where the magnetic flux response characteristic is given in the second-order vibration system, the relationships of a specific angular frequency $\omega_n$ and a damping factor $\xi$ may be derived according to FIG. 4 and the magnetic flux may be calculated using $\xi$ and $\omega_n$ so as to minimize the transient loss.

(Second Embodiment)

Figure 7:
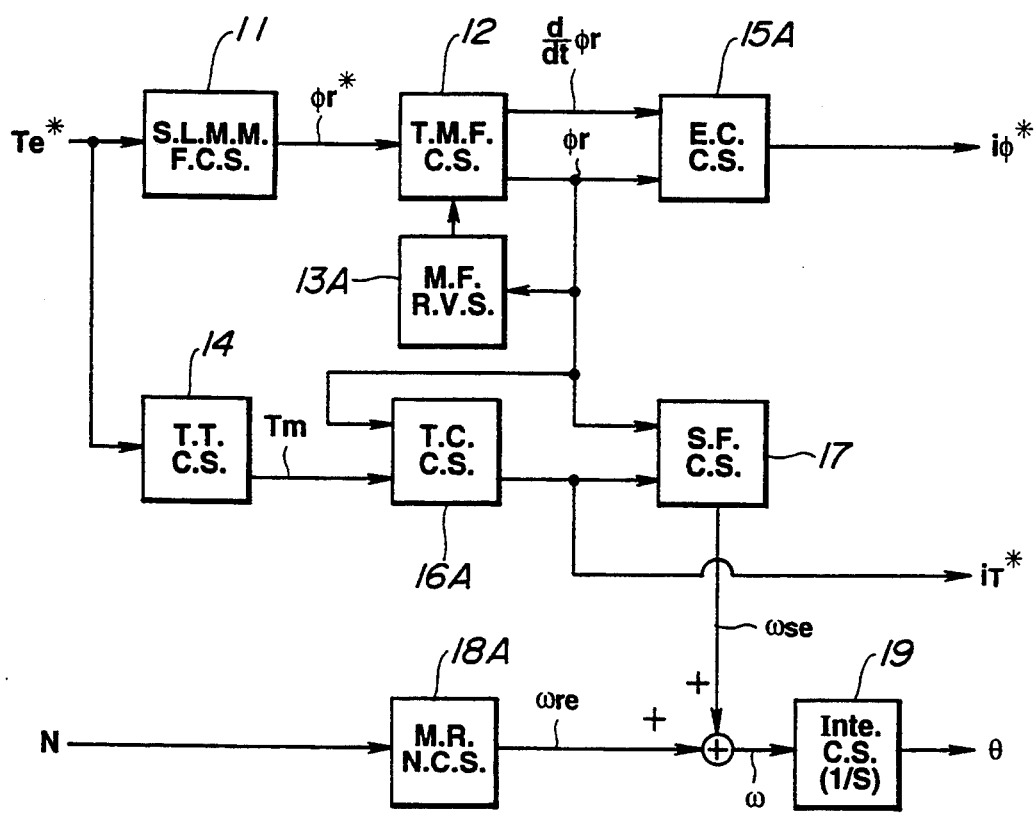
FIG. 7 is a circuit functional block diagram of the high efficiency drive/control calculating section of a second preferred embodiment according to the present invention.

FIG. 7 shows a second preferred embodiment of the system for controlling the induction motor according to the present invention.

In details, FIG. 7 is a circuit block diagram of the high efficiency drive/control calculating section 1 shown in FIG. 1.

It is noted that, in the second embodiment, as s compared with the circuit diagram of the first embodiment shown in FIG. 2, a magnetic flux response varying section (M. F. R. V. S.) 13A is added to the target magnetic flux calculating section 12 to vary the transfer function of the target magnetic flux calculating section 12 so as to so minimize the transient flux according to a magnitude of the target magnetic flux $\phi_r$.

The other system configuration shown in FIG. 7 is the same as that in the first embodiment shown in FIG. 2.

As shown in FIG. 7, the steady-state loss minimization magnetic flux calculating section 11 receives the torque instruction value $T_e^*$, calculates the magnetic flux $\phi_r^*$ which minimizes the loss (copper loss) at the steady state in response to the torque instruction value $T_e^*$.

The target magnetic flux calculating section 12 receives the steady-state loss minimization magnetic flux $\phi_r^*$ and calculates the target magnetic flux $\phi_r$ which corresponds to the input steady-state loss minimization magnetic flux $\phi_r^*$ at the steady state, namely when the torque instruction value provides a steady-state torque response for the induction motor 4 and which provides an optimum value such that the magnetic flux response corresponds to the torque response at the transient state and calculates its first-order differentiated value denotes by $d\phi_r/dt$.

The magnetic flux response varying section 13A varies the transfer function in the target magnetic flux calculating section 12 so as to minimize the transient loss according to the magnitude of the target magnetic flux $\phi_r$, namely, varies the magnetic flux response characteristic at the transient time.

The target torque calculating section 14 receives the torque instruction value $T_e^*$ and calculates the target torque $T_m$ on the basis of the predetermined transfer characteristic (set according to the required response characteristic and allowed current capacity).

The torque current calculating section 16A receives the target torque $T_m$ of the target torque calculating section 14 and the target magnetic flux $\phi_r$ of the target magnetic flux calculating section 12 and calculates the torque current instruction value $i_T^*$.

The slip frequency calculating section calculates the slip frequency on the basis of the received target magnetic flux $\phi_r$ and the torque current instruction value $i_T^*$. The motor revolution speed calculating section 18A calculates the motor revolution speed (electrical angle) $\omega_{re}$ as $(\pi/30)N\times P$. The integration calculating section 19 calculates the current phase angle $\theta$ by integrating the power supply frequency $\omega$ $(=\omega_{se}+\omega_{re})$ These calculating sections are already explained in the first embodiment shown in FIG. 2.

Therefore, the detailed explanation of the feature in the second embodiment will be made below.

As appreciated from the equation (8) defined above, the equation representing the loss $L_c$ has the term of $\phi_r \cdot d\phi_r/dt$. Therefore, the copper loss of $L_c$ is affected by the instantaneous magnitude of the target magnetic flux $\phi_r$ when the target magnetic flux $\phi_r$ changes. Hence, the transient loss becomes different depending upon a time at which the target magnetic flux $\phi_r$ rises from zero to a certain value except zero and upon a time at which the target magnetic flux $\phi_r$ falls from a certain value to zero. Consequently, if the transfer function in the target magnetic flux calculating section 12 is varied according to the magnitude of the target magnetic flux $\phi_r$, the transient loss can be suppressed to be low over a wide range of operation of the motor.

Figure 8:
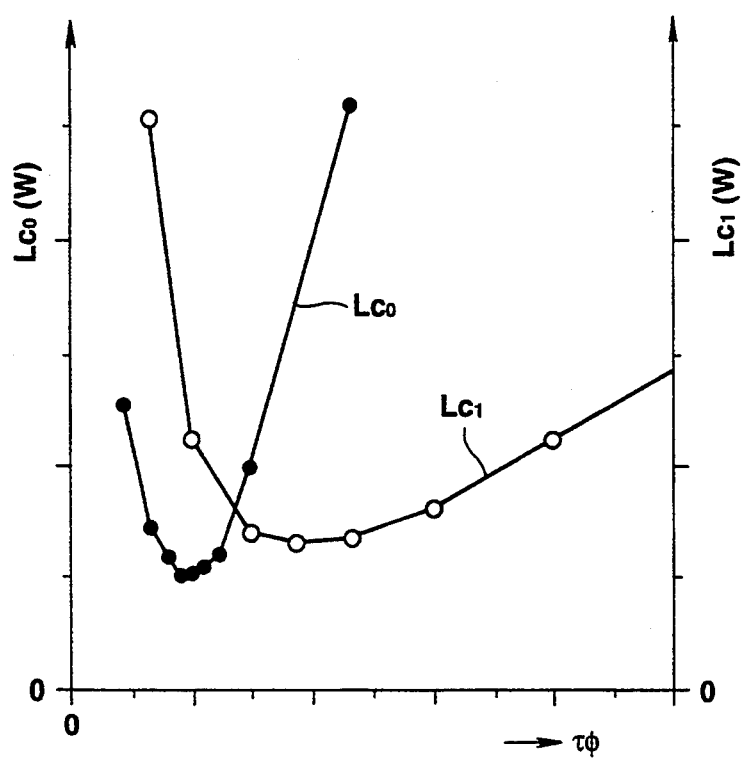
FIG. 8 is a characteristic graph representing a peak value of a loss in the induction motor and a calculated value of a loss energy within a certain time with respect to a time constant $\tau_\phi$ of a target magnetic flux when a change in a stepwise form of a torque instruction value $T_e^*$ is input to the high efficiency drive/control calculating section (H. F. D/C. C. S.) shown in FIG. 7.

FIG. 8 shows the relationship between plotted transient loss peal values and the time constant $\tau_\phi$ of the target magnetic flux $\phi_r$ in the stepwise torque response when the transfer characteristic at the target magnetic flux calculating section 12 is represented by the equation (12) and the transfer function of the target torque calculating section 14 is represented by the equation (13).

In FIG. 8, $L_{c0}$ denotes the characteristic of the loss $L_c$ in a case of zero target magnetic flux $\phi_r$ before the torque instruction Value $T_e^*$ is changed in the stepwise manner and Lcl denotes that of $L_{c1}$ in a case of not zero magnetic flux $\phi_r$ before the torque instruction value $T_e^*$ is changed in the stepwise manner.

As shown in FIG. 8, the value of the target magnetic flux time constant $\tau_\phi$ which minimizes the transient loss is changed according to the magnitude of the target magnetic flux $\phi_r$ before the torque instruction value $T_e^*$ is changed in the stepwise manner (in this state, $d\phi_r/dt=0$).

Therefore, when the relationship between the magnitude of the target magnetic flux $\phi_r$ and time constant $\tau_\phi$ which minimizes the transient loss is taken in the form of the table map (look-up table method) and the time constant $\tau_\phi$ is varied according to the target magnetic flux $\tau_\phi$, the transient loss of the induction motor 4 can be reduced over a wider range of operation of the motor 4.

FIGS. 9A through 9D show characteristic graphs of the respective values as the results of the speed control simulations in cases when the time constant of the target magnetic flux $(\tau_\phi)$ which minimizes the transient loss is fixed as shown in FIGS. 6A through 6G in the case of the first embodiment and when the time constant $\tau_\phi$ is varied according to the magnitude of the target magnetic flux $\phi_r$ so as to minimize the transient loss.

Solid lines denoted by FIGS. 9A through 9D represent the characteristics in the case of FIGS. 6A through 6G and broken lines represents those in the case of the second embodiment shown in FIG. 7.

It is noted that the response characteristics of the torque are mutually the same.

In FIGS. 9A through 9D, when the target magnetic flux $\phi_r$ rises from zero at the time of t=0 as shown in FIG. 9C (,i.e., the torque instruction value $T_e^*$ rises from zero at the time of t=0 as shown in FIG. 9A), both cases on the fixed and varied time constants $\tau_\phi$ indicate the same level of loss $L_c$ as shown in FIG. 9D. In the torque transient state from a time when the target magnetic flux $\phi_r$ rises to a certain value ($\phi_r \neq 0$), the loss of $L_c$ is suppressed to lower in the case of the second embodiment as shown in FIG. 9D.

(Third Embodiment)

Figure 10:
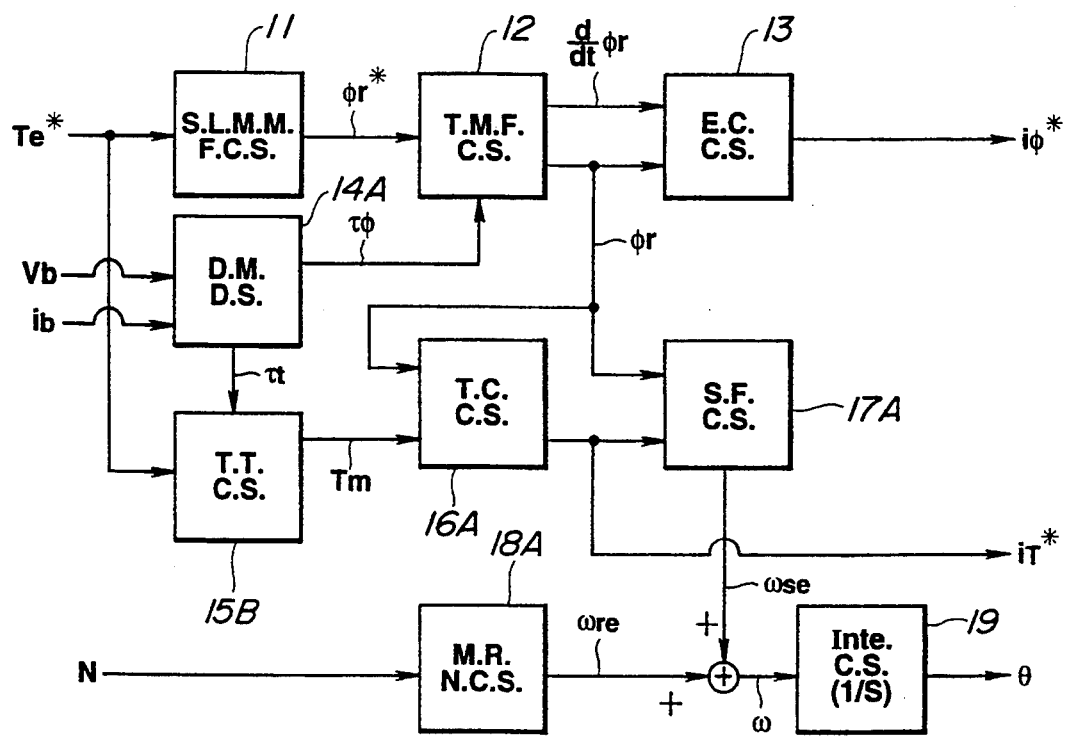
FIG. 10 is a circuit functional block diagram of the high efficiency drive/control calculating section in a third preferred embodiment according to the present invention.
Figure 11:
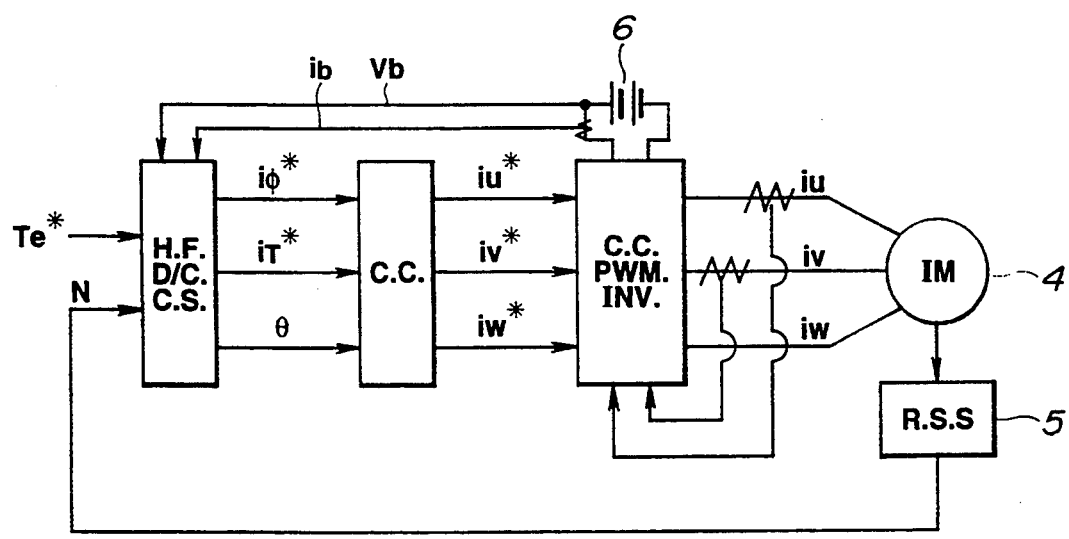
FIG. 11 is a schematic circuit block diagram of a whole system for controlling an induction motor in the third embodiment shown in FIG. 10.
Figure 12:
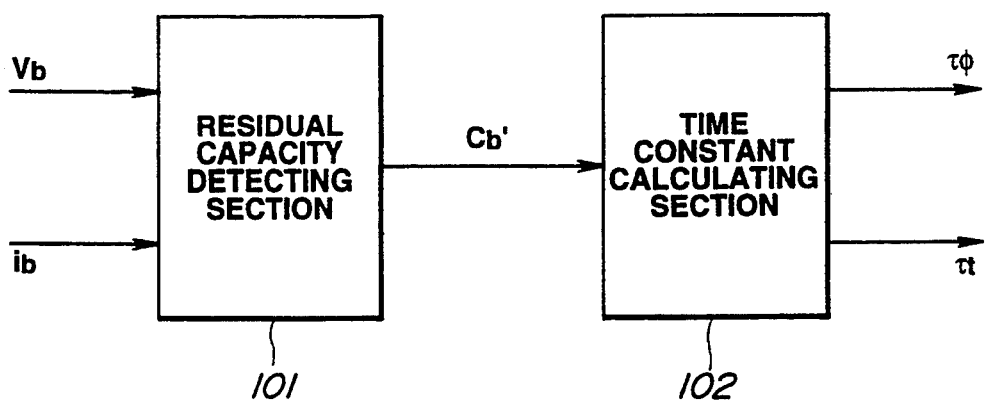
FIG. 12 is a schematic circuit block diagram of a driving mode detecting section (D. M. D. S.) 14A shown in FIG. 10.

FIGS. 10 through 12 show a third preferred embodiment of the induction motor controlling system according to the present invention.

In the third embodiment, a driving mode detecting section (D. M. D. S.) 14A is added so that the functions of the steady-state loss minimization magnetic flux calculating section 11, the target torque calculating section 15B, and the target magnetic flux calculating section 12 are different from those recited in the first embodiment shown in FIG. 2.

The other function of the calculating sections are the same as those in the first embodiment shown in FIG. 2.

The driving mode detecting section 14A shown in FIG. 10 is shown in FIG. 12.

As shown in FIG. 12, the driving mode detecting section 14A comprises a remaining (residual) capacity calculating section 101 and time constant calculating section 102.

FIG. 11 shows the whole system configuration of the motor controlling system of the induction motor 4.

The residual capacity calculating section 101 detects the terminal voltage $V_b$ across the DC power supply (battery) used to drive the induction motor 4, detects a current $i_b$ flowing through the induction motor 4 as shown in FIG. 11, and calculates the residual capacity $C_b'$ according to the following equation.

$$C_b' = C_{bO} - \int (V_b \cdot i_b) dt$$

In the equation defined above, $C_{bO}$ denotes a remaining capacity when the battery 6 is fully charged.

In the exemplified embodiment, the remaining capacity $C_b'$ is derived by subtracting a total power discharged from the battery from the value of $C_{bO}$ during the full charge of the battery 6.

It is noted that a resistor is inserted into the power supply line of the DC battery 6 to the PWM inverter to detect the current flowing through the induction motor 4.

In the third embodiment, the induction motor is a motor to drive the electric vehicle.

It is noted that, during the braking of the vehicle, the induction motor 4 is driven from the load, i.e., reversely from the tire wheels to be operated as a power generator so that the generated power is charged into the battery 6. This is called a regenerative braking.

During the regenerative braking, the direction of the current is opposite so that the value of $i_b$ in the above described remaining capacity equation indicates minus. Thus, the remaining capacity $C_b'$ is changed so as to be increased.

In addition, in the third embodiment, a lead storage battery is used for the DC battery 6.

Therefore, the remaining power capacity of the DC battery 6 can be detected from ① the battery terminal voltage, ② an internal resistance of the battery, and ③ relative weight of an electrolyte used in the battery 6.

In details, an electrolyte resistance of the lead storage battery is increased along with a decrease in a dilute sulfuric acid ($H_2SO_4$) in the electrolyte when the discharge occurs.

In addition, the internal resistance of the electrodes of the lead storage unit is raised since a large resistance of a discharged substance of $PbSO_4$ (lead sulfate) is increased together with the occurrence of discharge.

Furthermore, the relative weight of the electrolyte is approximately linearly reduced as the discharge occurs. Hence, when any one of the terminal voltage across the lead storage battery, the internal resistance, and relative weight of the electrolyte is measured, the remaining capacity can be detected.

In addition, the time constant calculating section 102 calculates the target magnetic flux response time constant $\tau_\phi$ which corresponds to the remaining capacity $C_b'$ and calculates the target torque response time constant $\tau_T$ which corresponds to the same.

Figure 13:
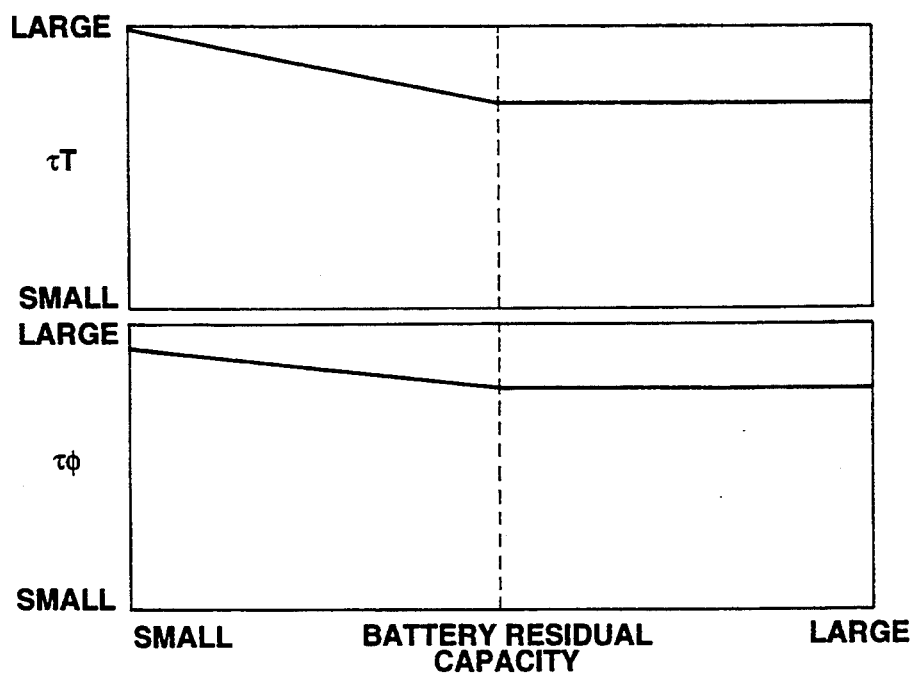
FIG. 13 is a characteristic graph representing a target magnetic flux response time constant $\tau_\phi$ and a target torque response time constant $\tau_T$ with respect to a remaining capacity $C'_b$ of a DC battery in the case of the third preferred embodiment shown in FIGS. 10 through 12.

FIG. 13 shows the characteristic graphs representing the target magnetic response time constant $\tau_\phi$ and the target torque response time constant $\tau_T$ which corresponds to the battery remaining capacity $C_b'$.

As shown in FIG. 13, the target magnetic flux response time constant $\tau_\phi$ and target torque response $\tau_T$ have respectively characteristics such that both time constant values of $\tau_\phi$ and $\tau_T$ are increased as the remaining capacity $C_b'$ is reduced in a case where the remaining capacity is lower (smaller) than a predetermined quantity (broken line in FIG. 13) and are constant irrespective of the remaining capacity in a case where the remaining capacity is larger than the predetermined quantity.

These results of FIG. 13 indicate that the target magnetic flux response and target torque response become slower as the remaining capacity becomes smaller in a case when the remaining capacity quantity is smaller than the predetermined quantity (not zero).

The steady-state loss minimization magnetic flux calculating section 11, the target magnetic flux calculating section 12, and the target torque calculating section 15 have generally the same functions as those recited in the first embodiment shown in FIG. 2.

However, in the calculation of the target torque calculating section 15 as described above, the value of the target torque response time constant $\tau_T$ is varied according to the remaining capacity as shown in FIG. 13.

In addition, the characteristic of FIG. 4 is the case where the target torque response time constant $\tau_T$ indicates the fixed value. If the time constant of $\tau_T$ is varied as shown in FIG. 13, the time constant $\tau_\phi$ of the target magnetic flux which minimizes the loss is also varied.

Therefore, the target magnetic flux time constant $\tau_\phi$ in the calculation carried out in the target magnetic flux calculating section 12 is varied according to the remaining capacity as shown in FIG. 13.

The target magnetic flux time constant $\tau_\phi$ indicates a value which minimizes the loss in the characteristic shown in FIG. 4 corresponding to the instantaneous time constant $\tau_T$ of the target magnetic flux.

As described above, the target torque time constant $\tau_T$ is varied according to the remaining capacity of the battery so that the target torque response is made slower in the case when the remaining capacity is reduced. That is to say, since the torque response characteristic to the accelerator operation of the vehicle driver is reduced so that the driver can easily determine the lowered capacity of the DC battery 6 according to the response characteristic of the motor in response to the accelerator depression.

In addition, although the transient loss can be reduced by enlarging the time constant $\tau_T$ of the target torque during the lowered remaining capacity of the battery 6, the transient loss can effectively be reduced so that the power consumption is reduced during the lowered remaining capacity, thus enabling the future travel distance of the vehicle to be extended.

FIGS. 14A through 14D show characteristic graphs of the torque instruction value $T_e^*$, torque target value $T_m$, the magnetic flux target value $\phi_r$, and the loss when the time constants of the target torque and target magnetic flux $\tau_\phi$ and $\tau_T$ are varied.

In FIGS. 14A through 14B, the characteristic curves of ①, ②, and ③ are those when the time constants and peak value are indicated as follows:

①: $\tau_T$ =0.087 sec., $\tau_\phi$=0.14 sec., and peak value=100%;
②: $\tau_T$=0.100 sec., $\tau_\phi$=0.15 sec., and peak value=86%; and
③: $\tau_T$=0.118 sec., $\tau_\phi$=0.16 sec., and peak value=74%

FIGS. 14B, 14C, and 14D shows the respective characteristics when the torque instruction value is raised as shown in FIG. 14A at a time of $t_0$.

As appreciated from FIGS. 14B through 14D, as both time constant values $\tau_T$ and $\tau_\phi$ of the target torque and target magnetic flux become large, the peak loss is reduced.

As described above, in the third embodiment, the time constants of $\tau_T$ and $\tau_\phi$ of the target torque and target magnetic flux become large when the battery remaining capacity is reduced so that the peak current is reduced in the transient state with the slow torque response. Thus, the reduction of the remaining capacity of the battery 6 can be reduced. Furthermore, since the peak current during the transient state is suppressed, the controlling system can prevent the battery voltage from instantaneously being reduced at the transient state not to give a harmful influence on the PWM inverter.

Since, in the third embodiment, the time constants $\tau_T$ and $\tau_\phi$ are varied according to the remaining charged capacity of the battery 6, the following effects can be achieved:

(1) The target torque response gets slower when the remaining charged capacity of the battery is reduced. Since the torque response characteristic is reduced in response to the driver's accelerator operation, the driver can easily determine the reduction of the remaining charged capacity from the response to the motor according to the depression of the accelerator pedal.

(2) The transient loss during the lowered remaining capacity is effectively reduced so as to reduce the power consumption. In addition, the future travel distance can be extended.

(3) The peak current during the transient state can be reduced. The reduction of the remaining capacity of the battery can be achieved.

(4) Since the peak current during the transient state can be suppressed, the system can prevent the battery voltage from being instantaneously reduced. No harmful influence on the inverter operation is given.

(Fourth Embodiment)

Figure 15:
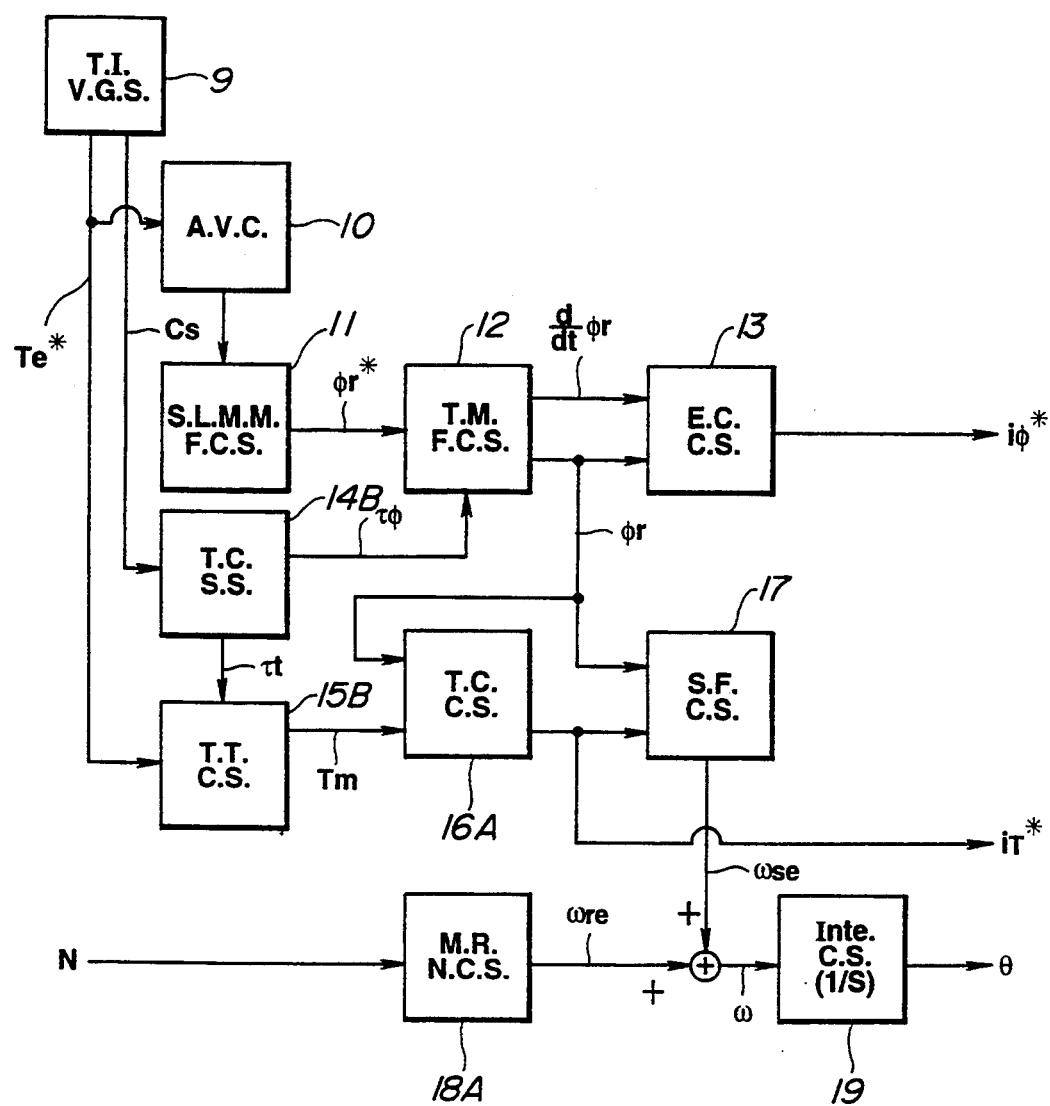
FIG. 15 is a circuit functional block diagram of the high efficiency drive/control calculating section of the system for controlling the induction motor in a fourth preferred embodiment according to the present invention.

FIG. 15 shows a fourth preferred embodiment of the motor controlling system applicable to the electric motor-driven vehicle.

Figure 16:
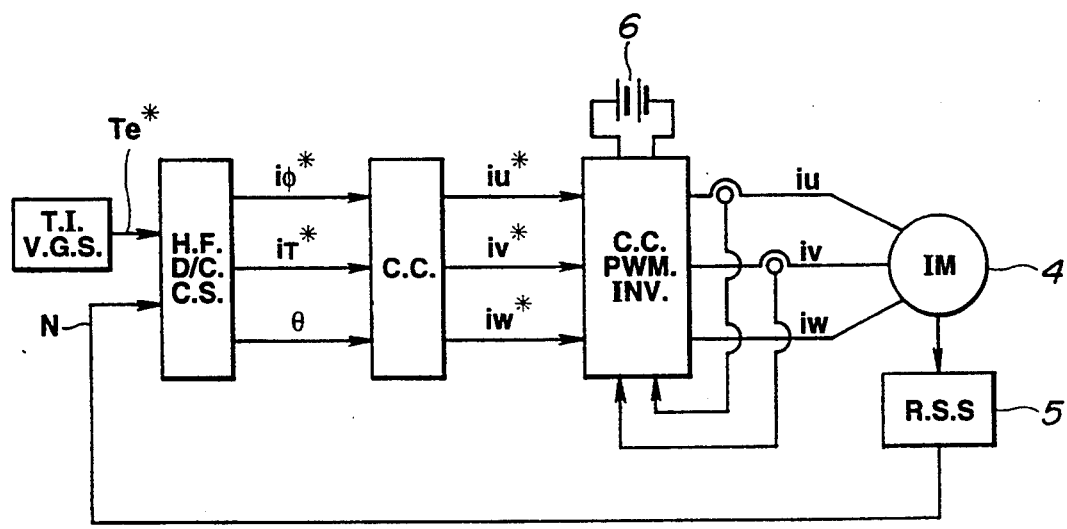
FIG. 16 is a schematic circuit block diagram of a whose system for controlling the induction motor in the fourth preferred embodiment according to the present invention.

FIG. 16 shows the whole system configuration of the motor controlling system shown in FIG. 15.

Figure 17:
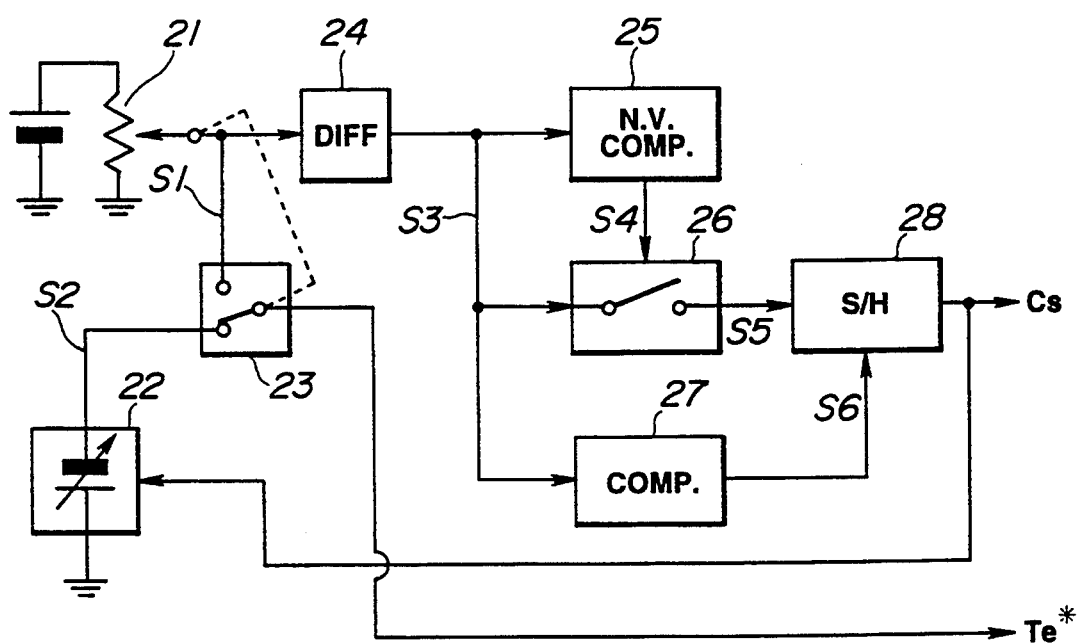
FIG. 17 is a circuit block diagram of a torque instruction value generating section 9 shown in FIG. 15.

FIG. 17 shows a detailed circuit block diagram of a torque instruction value generating section shown in FIG. 15 and FIG. 16.

In FIG. 15, a torque instruction value generating section 9 outputs the torque instruction value $T_e^*$ corresponding to an operating variable of the accelerator pedal of the electric vehicle and a regeneration instruction signal $C_S$ corresponding thereto.

It is noted that, in FIG. 16, the symbol of $T_e^*$ includes the torque instruction value and regeneration instruction signal $C_S$.

It is also noted that the torque instruction value $T_e^*$ indicates a positive value during the power drive state and indicates a negative value during the regenerative state and the regeneration instruction signal $C_s$ gives a different value depending upon the driving condition when the driving mode is transferred from the power drive state to the regeneration state.

Referring to FIG. 15, an absolute value circuit section 10 is installed for producing an absolute value of the torque instruction value $T_e^*$ so that a value derived from the absolute value circuit section 10 is always positive irrespective of the sign (positive or negative) of the torque instruction value $T_e^*$, i.e., irrespective of the state of either power drive state and regenerative state.

The absolute value circuit section 10 generally comprises a differential amplifier having an operational amplifier having a gain of 1, a non-inverting input end connected to the torque instruction value generating section 9, and an inverting input end grounded (zero potential).

In addition, a time constant setting section (T. C. S. S.) 14 determines the regenerative state according to the input regeneration instruction signal $C_s$ given from the torque instruction value generating section 9 and calculates the corresponding target magnetic flux response time constant $\tau_\phi$ and target torque response time constant $\tau_T$ according to the determination of the regenerative state.

The other circuit sections 11, 12, 13, 15B, 16A, 17, 18A, and 19 have generally the same functions as those described in the first embodiment.

FIG. 17 shows the circuit block diagram of the torque instruction value generating section 9 in the fourth embodiment shown in FIGS. 15 and 16.

in FIG. 17, an acceleration sensor 21 is provided on an accelerator pedal (not shown) to detect the operating variable of the accelerator pedal with the driver of the vehicle in which the induction motor 4 is mounted.

The acceleration sensor 21 comprises a potentiometer interlocked with the accelerator pedal on which the driver depresses (operates) and DC power supply.

A reference variable power supply 22 is installed which outputs the negative voltage whose level is varied according to the regeneration instruction signal $C_S$. An idling switch 23 is installed which interlocks with the acceleration sensor 21. When the accelerator pedal is open (the driver does not depress the accelerator pedal), the idling switch 23 is switched to the reference variable power supply side S2 (denoted by the solid line of FIG. 17). When the accelerator pedal is depressed or operated, the idling switch 23 is placed at a side S1.

A differentiator 24 is installed on the line S1 to differentiate an output voltage denoted by S1 of the acceleration sensor 21.

A negative voltage comparator 25 outputs a logic "1" signal when the differentiated value of the differentiator 24 is negatively larger than a negative predetermined value, for example, zero. A switching circuit 26 is tuned on while the logic signal of the negative comparator 25 indicates "1". A positive comparator 27 is provided for outputting a logic signal of "138 on a line S6 while the differentiated value of the differentiator 24 20 indicates a positive value which is larger than a predetermined positive value, for example, zero.

A sample/hold circuit 28 holds and outputs the output differentiated value S3 of the differentiator 24 while the switching circuit 26 is turned on and is reset in response to the output signal denoted by S6 of the positive comparator 27.

The output signal from the sample/hold circuit 28 indicates the regeneration instruction signal $C_s$. In addition, the output signal of the idling switch 23 indicates the torque instruction value $T_e*$.

FIGS. 18A through 18H show waveform charts of the respective circuits shown in FIG. 17.

When the acceleration sensor 21 outputs such an analog voltage signal S1 as shown in FIG. 18A, the output differentiated value S3 of the differentiator 24 is varied as shown in FIG. 18C. As shown in FIG. 18C, when the analog voltage of the acceleration sensor 21 rises incrementally, the differentiated value of the differentiator 24 provides a positively increasing signal and when the analog voltage of the acceleration sensor 21 falls from a certain high value toward zero, the differentiated value S3 of the differentiator 24 provides a negatively decreasing signal. The output level of the idling switch 23 is dependent on the analog voltage S1 of the acceleration sensor and reference variable negative power supply as shown in FIG. 18H. The position of the idling switch 23 is shown in FIG. 18B.

The sample/hold circuit 28 holds the output signal S5 from the switching circuit 28 and is reset to zero when the output signal S6 of the positive comparator 27 is given, namely, when the output signal S3 of the differentiator 24 indicates the positive value.

Hence, the regeneration instruction signal $C_s$ output from the sample/hold circuit 28 is output only when the output signal S3 of the differentiator 24 indicates the negative value the output signal of the sample/hold circuit 28 having a positive magnitude corresponding to a negative magnitude of the output signal S3 of the differentiator 24 as shown in FIG. 18G. The regeneration instruction signal $C_s$ serves to vary the reference variable power supply 22 so 25 as to output the negative voltage S2 according to the magnitude of the output signal $C_s$ of the sample/hold circuit 28.

On the other hand, as shown in FIGS. 18B and 18H, the output signal of the idling switch 23 provides the so torque instruction value $T_e*$. When the driver depresses the accelerator pedal the output signal S1 of the acceleration sensor 21 provides the torque instruction value $T_e*$, this signal S1 having a positive magnitude in proportion to a depression force (operating variable) or depression angle of the accelerator pedal by the driver.

At this time, the regeneration instruction signal $C_s$ indicates zero.

When the accelerator pedal is open (released state), the idling switch 23 is switched to the reference variable power supply side so that the output voltage S2 of the reference variable power supply 22 is output from the idling switch 23 as the torque instruction value $T_e$ torque instruction value, at this time, having a negative magnitude according to the voltage value of the reference variable power supply 22.

That is to say, the torque instruction value $T_e$ provides the positive value when the driving mode is in the power drive state and provides the negative value when the driving mode is in the regenerative drive state as shown in FIG. 18H.

The negative value of the torque instruction value $T_e*$ gives the value corresponding to the instantaneous driving condition when the driving mode is transferred from the power drive state to the regenerative state.

For example, in a case where the driver abruptly releases the accelerator pedal with the accelerator pedal being depressed deeply, the torque instruction value $T_e*$ gives the negatively large value.

On the contrary, in a case where the drive releases the accelerator pedal with the accelerator pedal being depressed lightly or shallowly, the torque instruction value $T_e*$ gives a negatively small value.

It is possible to set more precisely the value of the torque instruction value $T_e*$ according to a time so duration during which the driver depresses the accelerator pedal, a vehicular acceleration, vehicle speed, motor revolution speed, torque current, excitation current, an application degree or situation of a foot brake of the vehicle, and so forth.

Referring back to FIG. 15, the time constant setting circuit (T. C. S. S.) 14 in the fourth embodiment calculates the target magnetic flux response time constant $\tau_\phi$ and the target torque response time constant $\tau_T$ according to the determination of the level of the regeneration instruction signal $C_s$ from the torque instruction value generating section 9.

In details, when the regeneration instruction signal $C_s$ indicates zero, i.e., in the power drive state, the time constant setting section (circuit) 14 outputs the respectively predetermined target magnetic flux response time constant $\tau_\phi$ and target torque response time constant $\tau_T$. At this time, the time constant values of $\tau_\phi$ and $\tau_T$ are set to smaller values so as to obtain a quick response characteristic to the torque instruction value $T_e*$.

On the other hand, during the regenerative state, the target magnetic flux response time constant and target torque response time constant $\tau_\phi$ and $\tau_T$ are varied according to the negative magnitude of the regeneration instruction signal $C_s$. For example, if the accelerator pedal is abruptly released with the accelerator pedal depressed deeply, the magnitude of the regeneration instruction signal $C_s$ becomes large and, in this case, both time constants of $\tau_\phi$ and $\tau_T$ are set to relatively small values (but larger than those during the power drive state).

On the contrary, if the driver releases the accelerator pedal with the accelerator pedal depressed lightly, the magnitude of the regeneration instruction value $C_s$ is so small that the values of both time constants $\tau_\phi$ and $\tau_T$ provide relatively large values.

The calculated values of the time constants described above serve to set the target magnetic flux response time constant $\tau_\phi$ of the steady-state loss minimization magnetic flux calculating section 11 and $\tau_T$ of the target torque calculating section 15.

It is noted that since the value of the torque instruction value $T_e^*$ is varied according to a state in which the driving mode is transferred from the power drive state to the regenerative state, the response time constants of $\tau_\phi$ and $\tau_T$ may be varied depending upon the torque instruction value itself $T_e^*$ in place of the regeneration instruction signal $C_s$.

That is to say, when the torque instruction value $T_e^*$ is positive, i.e., during the power drive state, the time constant setting section 14 outputs the predetermined target magnetic flux response time constants $\tau_\phi$ and target torque response time constants $\tau_T$, respectively. When the torque instruction value $T_e^*$ indicates the negative value, i.e., during the regenerative state, the values of the target torque response time constants and target magnetic flux response time constants may be varied according to the negative magnitude of the torque Instruction value $T_e^*$ in the same way as described above.

The steady-state loss minimization flux calculating section 11, target magnetic flux calculating section 12, and target torque calculating section 15 are the same functions as those recited in the first, second, and third embodiments.

FIGS. 19A through 19D show dynamic characteristic graphs of rotor magnetic flux $\phi_r$, the excitation current $i_\phi$, the torque current $i_T$, and torque value $T_e$ when the driving mode of the motor 4 is transferred from the power drive state to the regenerative state.

In the fourth embodiment, the time constants on the excitation current $i_\phi$ and torque current $i_T$ are varied and the distribution ratio between the excitation current $i\phi$ and torque current $i_T$ is so controlled as to provide a most efficient drive of the motor 4. Such a distribution control as described above is the same both in the states of the power drive and regenerative state.

In addition, the negative torque required during the regenerative state is carried out by reversing the polarity of the torque current $i_T$. Hence, as shown in FIG. 19C, the torque current $i_T$ provides a negative value during the regenerative state and accordingly the torque $T_e$ provides the negative value.

Since the torque $T_e$ is expressed as $T_e = k \cdot \phi_r \cdot i_T$ (provided that k denotes the constant), either of the polarities of the magnetic flux $\phi_r$ and torque current $i_T$ may be reversed in order to provide the torque with the negative value. However, it is noted that it is not preferable to reverse the polarity of the magnetic flux $\phi_r$ since the magnetic flux $\phi_r$ does not immediately follows the excitation current $i_\phi$ even if the excitation current $i_\phi$ is varied. In the fourth embodiment, the negative torque is generated by reversing the sign of the torque current $i_T$.

To achieve the above-described functions, in the fourth embodiment, the absolute value circuit section 10 is installed so that the positive torque instruction value $T_e^*$ is always supplied td the steady-state loss minimization magnetic flux calculating section 11, thereby always providing the target magnetic flux $\phi_r$ with the positive value. The target torque calculating section 15 directly receives the torque instruction value $T_e^*$. Therefore, if the torque instruction value $T_e^*$ provides the negative value during the regenerative state, the torque current instruction value $i_T^*$ provides the negative value.

Furthermore, as described above, the time constant setting section 14 in FIG. 15 determines the regenerative state according to the regenerative instruction signal $C_s$ (or torque instruction value $T_e^*$) supplied from the torque instruction value generating section 9 and calculates the target magnetic flux response time constants $\tau_\phi$ and the target torque response time constant $\tau_T$ according to the magnitude of the regeneration instruction signal $C_s$.

For example, if the driver of the vehicle abruptly releases the accelerator pedal with the accelerator pedal depressed deeply (the operating variable of the accelerator pedal is large), the magnitude of the regeneration instruction signal $C_s$ is so large that both time constant values of $\tau_\phi$ and $\tau_T$ provide the relatively small values (but larger than those during the power drive state). Consequently, the target torque $T_m$ varies relatively quickly. On the other hand, since the target magnetic flux $\phi_r$ always provides the positive value, the actual magnetic flux $\phi$ is changed in such a way as to be varied toward the positive target magnetic flux value $\phi_r$ so as not to occur the abrupt torque variation with the transient loss minimized. In addition, if the driver releases the accelerator pedal with the accelerator pedal depressed lightly (operating variable of the accelerator pedal is small), the regeneration instruction signal $C_s$ is so small that both target magnetic flux response time constant $\tau_\phi$ and target torque response time constant $\tau_T$ provide relatively large values. Consequently, the variations in the target torque $T_m$ and target magnetic flux $\phi_r$ become furthermore slower (or moderate).

In the fourth embodiment, the magnetic flux response characteristic is given in the equation (11) and the torque response characteristic is given in the equation (12). However, the torque response function may be given in the second-order vibration system and the magnetic flux response function may be given in the same second-order vibration system as described in the case of the first embodiment.

(Fifth Embodiment)

Figure 20:
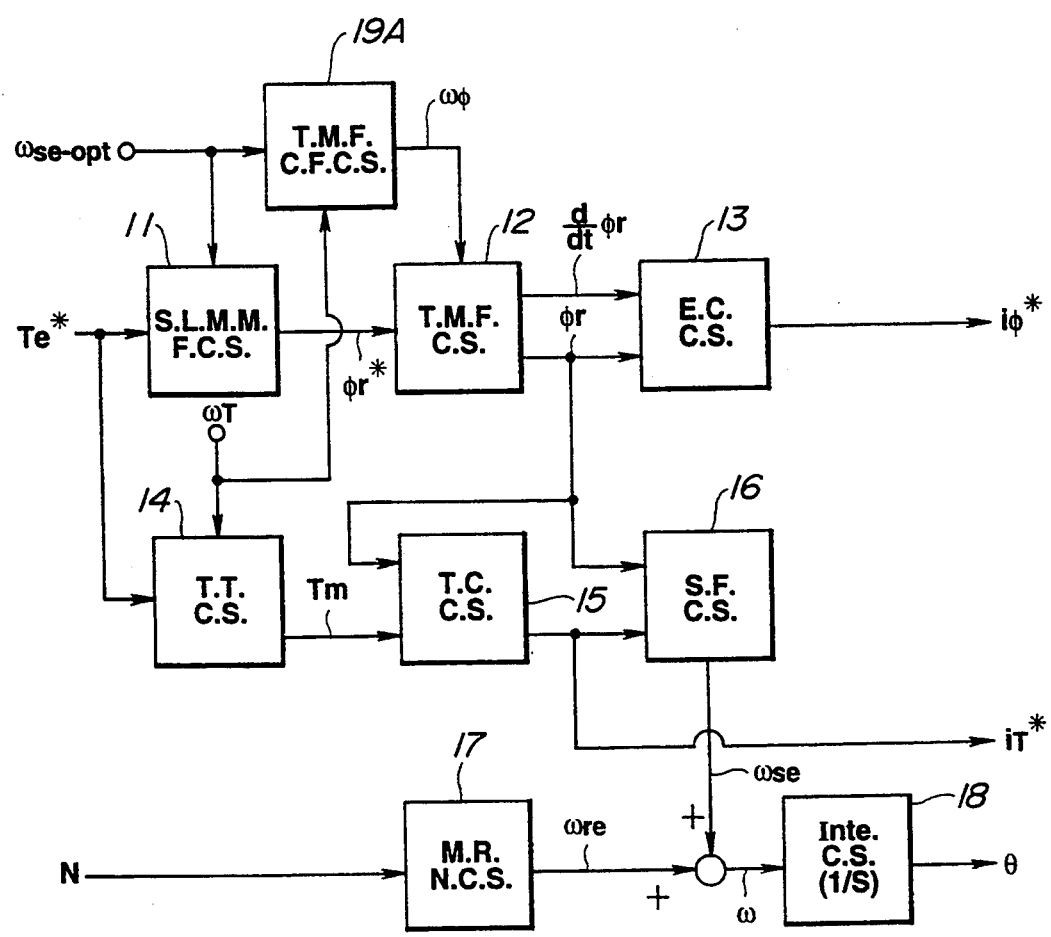
FIG. 20 is a circuit functional block diagram of the high efficiency drive/control calculating section in a fifth preferred embodiment of the system for controlling the induction motor according to the present invention.

FIG. 20 shows the high efficiency drive/control calculating section 1 in a fifth embodiment the motor controlling system according to the present invention.

Figure 21:
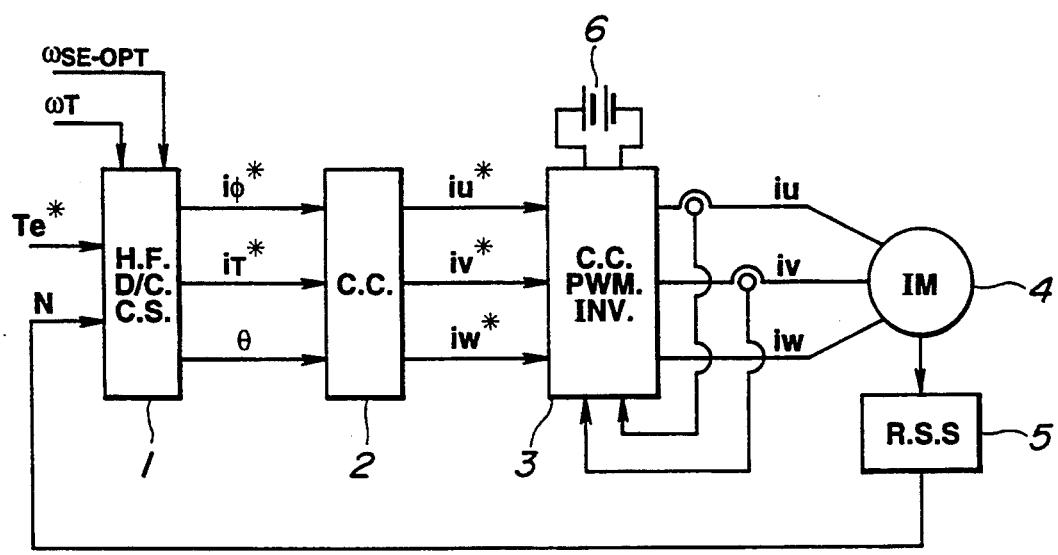
FIG. 21 is a schematic circuit block diagram of a whole system for controlling the induction motor in the fifth embodiment shown in FIG. 20.

FIG. 21 shows a whole system configuration of the motor controlling system in the fifth embodiment shown in FIG. 20.

As shown in FIG. 20, as the features in the fifth embodiment, the high efficiency drive/control calculating section 1 receives the optimum steady-state loss minimization slip frequency $\omega_{se\text{-}opt}$ and a cut-off frequency $\omega_T$ (a frequency at which the gain of, for example, the low pass filter is reduced to 0.707 ($-3$ dB, $1/\sqrt{2}$) from 1) of the target torque transfer function and a target magnetic flux cut-off frequency calculating section 19A calculates a cut-off frequency $\omega_\phi$ of the target magnetic flux transfer function.

The steady-state loss minimization slip frequency $\omega_{se\text{-}opt}$ is derived from a predetermined map previously set, for example, according to a temperature in the induction motor 4. In addition, the cut-off frequency of the target torque transfer function may be fixed or alternatively may be varied according to the remaining charged capacity of the battery 6 shown in FIG. 21 which is mounted in the electric vehicle used to drive the motor 4.

The steady-state loss minimization magnetic flux calculating section 11 receives the above-described steady-state loss minimization slip frequency $\omega_{se\text{-}opt}$ and torque instruction value $T_e^*$ and calculates the magnetic flux $\phi_r^*$ which minimizes the loss (copper loss) in the steady state according to the torque instruction value $T_e^*$. The torque instruction value $T_e^*$ is that described in the fourth embodiment shown in FIG. 17.

Next, the functions of the steady-state loss minimization magnetic flux calculating section 11, the target magnetic flux calculating section 12, the target torque calculating section 14, and the target magnetic flux cut-off frequency calculating section 19A will be explained below.

At First, the calculation formula of the target magnetic flux response which minimizes the transient loss will be derived.

It is necessary to suppress a peak current in the case of the transient torque response. Hence, it is necessary to carry out the control such that the large torque is output with a less current. In the vector control method of the induction motor, the stator current indicates a vector sum between the torque current $i_T$ and excitation current $i_\phi$ so that the torque efficiency becomes maximum when $i_\phi = i_T$. That is to say, in the vector control, the following equation (13) is established:

$$T_e = k \cdot i_\phi \cdot i_T \qquad (13)$$

wherein k denotes the constant.

As expressed in the equation (13), if the term of $(i_\phi \cdot i_T)$ gives the constant, the output torque denoted by $T_e$ is constant.

Figure 22:
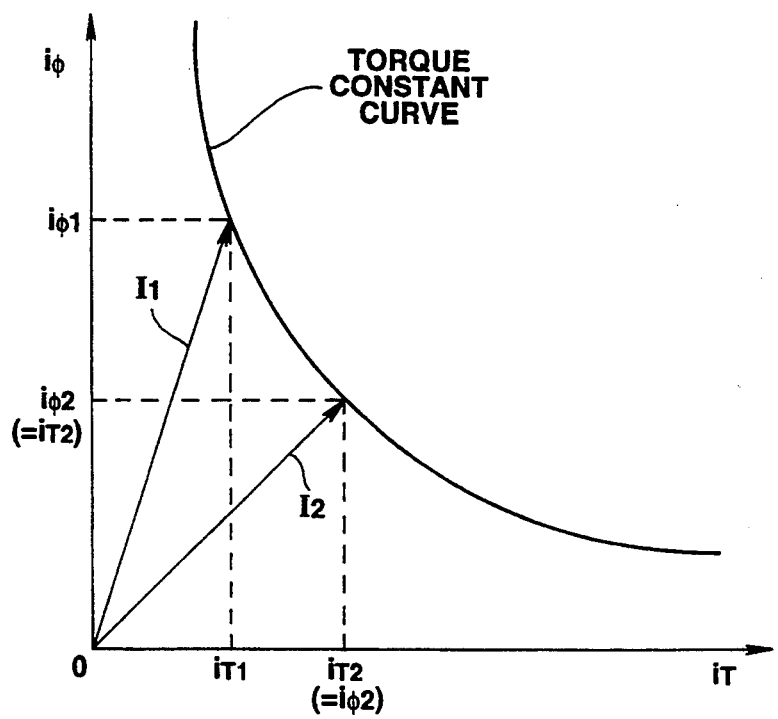
FIG. 22 is a characteristic graph representing a relationship between an exciting current and a torque current in the induction motor shown in FIG. 21.

Hence, a torque constant line (curve) is traced as shown in FIG. 22. In FIG. 22, vector $I_1$ and vector $I_2$ denote magnitudes of the stator current.

From among the stator current values which are at minimum and which can be traced along the torque constant curve, the stator current expressed as $i_\phi = i_T$.

Hence, suppose that such a step torque response as the vehicle start (the vehicle is started from zero speed, i.e., the motor is started to be driven) at which the peak current becomes maximum at the transient time. The peak current is minimized when selecting the target magnetic flux response so as to make the excitation current equal to the torque current $i_T$. It is noted that, in FIG. 22, $i_{\phi 2} = i_{T2}$ and the stator current $I_2$ at this time gives a minimum value when the same torque is given.

In order to carry out the above-described control, the calculation formula of the rotor magnetic flux $\phi_r^*$ which minimizes the steady-state loss in the steady-state loss minimization calculating section 11 is given in the equation (6) described in the first embodiment and the calculation formula of the target magnetic flux $\phi_r$ in the target magnetic flux calculating section 12 is given in the equation (14).

$$\phi_r = \frac{\omega_\phi}{S + \omega_\phi} \phi_r^* \qquad (14)$$

In the equation (14), S denotes the Laplace operator.

In addition, the calculation formula of the target torque $T_m$ in the target torque calculating section 14 is given in the following equation (15).

$$T_m = \frac{\omega_T}{S + \omega_T} T_e^* \qquad (15)$$

In the case where the target magnetic flux $\phi_r$ and the target torque $T_m$ are set as in the equations (14 and 15), the cut-off frequency $\omega_\phi$ of the transfer function of the target magnetic flux calculating section 12 is derived which makes $i_\phi$ equal to $i_T$ at the transient time.

It is noted that the calculation of the cut-off frequency $\omega_\phi$ is carried out by means of a digital computer (digital signal processor).

Suppose herein that a sampling period of the digital computer is denoted by $\Delta$. Hence, a variable x[K] is integrated using an Eurer's integration method as follows:

$$x[K+1] = x[K] + \Delta \dot{x}[K] \qquad (16)$$

wherein $\dot{x}$[K] denotes a differentiation of x[K] and K (sampling time order) = 0, 1, 2, 3, ...

When applying the above relationship (16), $\omega_\phi$ is derived which makes $i_\phi$[1] at the transient time (K=1) equal to $i_T$[1].

Then, the transfer -Function of the excitation current $i_\phi$ with respect to the torque instruction value $T_e^*$ is given in the equation (17).

$$i_\phi = \frac{\omega_\phi \cdot (S + R_r/L_r)}{(S + \omega_\phi) M \cdot R_r/L_r} \phi_r^* \qquad (17.1)$$

$$\phi_r^* = \sqrt{(R_r \cdot T_e^*/P \cdot \omega_{se-opt})} \qquad (17.2)$$

Hence, $i_\phi$[1] at K=1 can be derived as:

$$i_\phi[1] = \omega_\phi \cdot L_r/(MR_r)(R_r/L_r - \omega_\phi) \cdot \phi_r^*[0] + \omega_\phi \cdot L_r/(MR_r) \phi_r^*[1] \qquad (18).$$

In this case, since the stepwise input (unit step function) is supposed, $\phi_r^*[0] = \phi_r^*[1]$ in the time discrete form. Therefore, the following equation (18) is arranged in the following equation (19).

$$i_\phi[1] = \omega_\phi L_r/(MR_r) \cdot (R_r/L_r - \omega_\phi) \cdot \phi_r^*[0] + \omega_\phi L_r/(MR_r) \cdot \phi_r^*[0] \qquad (19).$$

On the other hand, the target magnetic flux $\phi_r$ with respect to the torque instruction value $T_e^*$ is expressed as:

$$\dot{\phi}_r[0] = \omega_\phi \cdot \{\phi_r^*[0] - \phi_r[0]\} \qquad (20.1),$$

wherein $\dot{\phi}_r[0]$ is the differentiation of $\phi_r[0]$.

In addition, $$\phi_r[1] = \phi_r[0] + \Delta \cdot \dot{\phi}_r[0] \qquad (20.2).$$

$$\phi_r[0] = 0 \qquad (20.3)$$

$$\phi_r[1] = \Delta \cdot \dot{\phi}_r[0] = \Delta \omega_\phi \cdot \phi_r^*[0] \qquad (20.4)$$

In the same way, the target torque $T_m$ can be derived from the following equation:

$$T_m = \Delta \omega_T T_e^* \qquad (21).$$

Hence, the torque current $i_T$[1] at K=1 is given as:

$$i_T[1] = L_r/(PM) \cdot T_m[1]/\phi_r[1] \qquad (22)$$
$$= L_r/(PM) \cdot \Delta \omega_T \cdot T_e^*[0]/\Delta \omega_\phi \cdot \phi_r^*[0].$$

Since the equation (22) is assumed to be equal to the equation (19), both equations (22) and (19) are rearranged:

$$\Delta \cdot \omega_\phi^3 - (\Delta R_r/L_r + 1) \cdot \omega_\phi^2 + \omega_T \omega_{se-opt} = 0 \qquad (23).$$

In the strict mean of sense, it is a best way, when solving the equation (23), to derive the relationship between $\omega_\phi$, $\omega_T$, and $\omega_{se\text{-}opt}$ from the equation (23).

However, since the sampling period $\Delta$ is negligibly small and $\Delta \approx 0$, the equation (23) can be rearranged as:

$$\omega_\phi = \sqrt{(\omega_T \omega_{se\text{-}opt})} \qquad (24).$$

Therefore, the derived values of the cut-off frequency $\omega_T$ and of the slip frequency which minimizes the steady-state loss $\omega_{se\text{-}opt}$ are used to calculate the cut-off frequency $\omega_\phi$ of the target magnetic flux transfer function. The target magnetic flux cut-off frequency calculating section 19A carries out the above calculation of (24).

It is noted that since, in general the vector control, the rotor time constant variation $\tau_r = L_r/R_r$ (wherein, $L_r$ denotes a rotor self-inductance and $R_r$ denotes a rotor resistance) gives influence on the torque control performance, a temperature compensation of the rotor resistance $R_r$ is carried out. This compensation of temperature is exemplified by a Japanese Book titled "New Drive Electronics" pages 206 to 209, published by Denki Shoin in Jul. 30, 1986.

Then, if the rotor resistance $R_r$ is varied, the steady-state loss minimization slip frequency $\omega_{se\text{-}opt}$ is also varied in accordance with the equation (2). Therefore, with the values of $\omega_{se\text{-}opt}$ mapped according to the motor temperature, the value of the slip frequency $\omega_{se\text{-}opt}$ is read which accords with the temperature is read and supplied to the target magnetic flux cut-off frequency calculating section 19. Thus, the cut-off frequency $\omega_\phi$ is calculated based on the equation (24). The cut-off frequency $\omega_\phi$ of the target magnetic flux calculating section 12 is set so that the high efficiency control can be achieved in regardless of the operation situation in the motor. Alternatively, with the cut-off frequency $\omega_\phi$ of the target magnetic flux transfer function previously calculated according to the cut-off frequency $\omega_\phi$ of the target magnetic flux transfer function and the steady-state loss minimization slip frequency $\omega_{se\text{-}opt}$ the value of $\omega_\phi$ may be mapped so as to read it.

As described hereinabove, since in the vector control system and method according to the present invention, the transient loss can be reduced in a case where the same response characteristic is taken as the method in which the slip frequency is always maintained at the steady-state loss minimization slip frequency $\omega_{se\text{-}opt}$. On the contrary, if the current capacity is the same, the quick torque response characteristic can be achieved. In addition, the motor drive control can be achieved which minimizes the loss in the same way as the previously proposed method of controlling the motor disclosed in the reference A.

It will fully be appreciated by those skilled in the art that the foregoing description has been made to the preferred embodiment and various changes and modifications may be made without departing from the scope of the present invention which is to be defined by the appended claims.

What is claimed is:

1. A system for controlling an induction motor, comprising:

a) steady-state loss minimization magnetic flux calculating means for calculating a rotor magnetic flux which minimizes a steady-state loss of the induction motor in response to a torque instruction value;

b) target magnetic flux calculating means for receiving the steady-state loss minimization magnetic flux and for calculating a target magnetic flux and a first-order differentiated value of the target magnetic flux on the basis of a transfer function having a low pass filter characteristic;

c) target torque calculating means for calculating a target torque value of the induction motor on the basis of a predetermined transfer function in response to the torque instruction value;

d) means for detecting a revolution speed of the induction motor;

e) vector control calculating means for calculating a current instruction value on the basis of predetermined circuit constants of an equivalent circuit of the induction motor and according to the calculated target magnetic flux, the first-order differentiated value of the target magnetic flux, the calculated target torque value, and revolution speed of the motor; and f) motor drive means for driving the induction motor, so that a current actually passing through the induction motor approaches the current instruction value, and so that an output torque of the induction motor has a value corresponding to the target torque.

2. A system for controlling an induction motor as claimed in claim 1, wherein said target magnetic flux calculating means comprises a filter having a transient response characteristic to minimize the transient loss of the induction motor.

3. A system for controlling an induction motor as claimed in claim 1, which further comprises:

g) magnetic flux response varying means for varying the transfer function of the target magnetic flux calculating means so as to minimize a transient loss according to a magnitude of the target magnetic flux.

4. A system for controlling an induction motor as claimed in claim 1, which further comprises:

g) remaining capacity detecting means for detecting a remaining charged quantity of power of a battery which is used to supply a driving power to the induction motor via said motor driving means, and wherein the low pass filter characteristic of the target magnetic flux calculating means is determined according to the detected remaining quantity of capacity of the battery and the transfer function of the target torque calculating means is determined according to the remaining charged quantity of the battery.

5. A system for controlling an induction motor as claimed in claim 4, wherein a time constant of the transfer function of the target magnetic flux calculating means is a function of the remaining charged quantity of the battery.

6. A system for controlling an induction motor as claimed in claim 4, wherein a time constant of the transfer function of the target torque calculating means is a function of the remaining capacity of the battery.

7. A system for controlling an induction motor as claimed in claim 1, wherein said inductor motor is a motor through which a vehicle is driven to run the vehicle, which further comprises:

g) torque instruction value generating means for generating the torque instruction value which corresponds to an operation of a driver of the vehicle during a power drive state in which the motor drives the vehicle and for generating the torque instruction value whose sign is a minus with respect to the power drive state when the vehicle drives the motor to regenerate the motor in a regenerative state; and h) an absolute value circuit which outputs an absolute value of the torque instruction value, and wherein said steady-state loss minimization calculating means calculates the rotor magnetic flux which minimizes the steady-state loss of the induction motor on the basis of the absolute value of the torque instruction value passed through the absolute value circuit, and said target torque calculating means calculates the target torque of the induction motor from the torque instruction value on the basis of the predetermined transfer function which is different depending on either the power drive state or the regenerative state.

8. A system for controlling an induction motor as claimed in claim 7, wherein said torque instruction value generating means generates a positive torque instruction value which corresponds to a magnitude of the operation of the driver during the power drive state and generates a negative magnitude of the torque instruction value having a negative magnitude which accords to a state in which the motor driving mode is transferred from the power drive state to the regenerative state during the regenerative state.

9. A system for controlling an induction motor as claimed in claim 8, wherein said target torque calculating means calculates the target torque on the basis of the predetermined transfer function during the power drive state and calculates the target torque on the basis of the different transfer function which is previously set according to the torque instruction value during the generative state.

10. A system for controlling an induction motor as claimed in claim 9, wherein the transfer function of said target magnetic flux calculating means is provided with a time constant which minimizes the steady-state loss according to the torque instruction value during the regenerative state.

11. A system for controlling an induction motor as claimed in claim 10, wherein said target magnetic flux calculating means selects the transfer function having a time constant which minimizes the loss according to the torque instruction value during the regenerative state.

12. A system for controlling an induction motor as claimed in claim 8, wherein said target magnetic flux calculating means selects the transfer function having a time constant which minimizes the loss according to the torque instruction value during the regenerative state.

13. A system for controlling an induction motor as claimed in claim 7, wherein the transfer function of said target magnetic flux calculating means is provided with a time constant which minimizes the steady-state loss according to the torque instruction value during the regenerative state.

14. A system for controlling an induction motor as claimed in claim 11, wherein said target magnetic flux calculating means selects the transfer function having a time constant which minimizes the loss according to the torque instruction value during the regenerative state.

15. A system for controlling an induction motor as claimed in claim 1, wherein said steady-state loss minimization magnetic flux calculating means receives the torque instruction value and a slip frequency $\omega_{se\text{-}opt}$ which minimizes the steady-state loss of the induction motor at the instantaneous operation state when the torque instruction value is issued and calculates the rotor magnetic flux which minimizes the steady-state loss at the received torque instruction value, wherein said target torque calculating means calculates the target torque of the induction motor on the basis of the transfer function having the low pass filter characteristic, said low pass filter having a cut-off frequency $\omega_T$, which further comprises target magnetic flux cut-off frequency calculating means for calculating the cut-off frequency $\omega_\phi$ of the target magnetic flux transfer function upon receipt of the cut-off frequency $\omega_T$ of the target torque transfer function and the slip frequency $\omega_{se\text{-}opt}$ which minimizes the steady-state loss, and wherein said target magnetic flux calculating means calculates the target magnetic flux and the first-order differentiated value of the target magnetic flux on the basis of the transfer function having the low pass filter characteristic, said low pass filter having a cut-off frequency $\omega_\phi$ set in the target magnetic flux cut-off frequency calculating means.

16. A system for controlling an induction motor as claimed in claim 15, wherein said target magnetic flux cut-off frequency calculating means calculates the cut-off frequency $\omega_\phi$ of the transfer function of the target magnetic flux using the equation defined below:

$$\omega_\phi = \sqrt{(\omega_T \omega_{se\text{-}opt})}.$$

17. A system for controlling an induction motor as claimed in claim 16, wherein said slip frequency $\omega_{se\text{-}opt}$ which minimizes the steady-state loss is a value set on the basis of operation variables of the motor including at least an induction motor temperature.

18. A system for controlling an induction motor as claimed in claim 15, wherein said slip frequency $\omega_{se\text{-}opt}$ which minimizes the steady-state loss is a value set on the basis of operation variables of the motor including at least an induction motor temperature.

19. A system for controlling an induction motor applicable to an electric motor-driven vehicle, comprising:

a) a steady-state copper loss minimization magnetic flux calculating section which is constructed as to calculate a rotor magnetic flux $\phi_r^*$ which minimizes a steady-state copper loss of the motor in the steady state in response to a torque instruction value $T_e^*$ as follows:

$$\phi_r^* = \sqrt{\frac{(R_r \cdot T_e^*)}{(\omega_{se-opt} \cdot P)}},$$

$$\text{wherein } \omega_{se-opt} = \sqrt{\frac{(R_s \cdot R_r^2)}{(R_s \cdot L^{2r} + R_r \cdot M^2)}}$$

wherein $\omega_{se\text{-}opt}$ denotes a slip frequency of the motor which minimizes the copper loss $L_c$ at the steady state which is defined as $d\phi_r/dt = 0$, $R_s$ denotes a stator resistance, $R_r$ denotes a rotor resistance, $L_r$ denotes a rotor self-inductance, and M denotes a mutual inductance between the stator and rotor, and P denotes a number of mutually opposing N-S pole numbers of the motor which is half the total number of N and S poles;

b) a target magnetic flux calculating section which is so constructed as to receive said steady-state copper loss minimization magnetic flux $\phi_r{}^*$ from said steady-state copper loss minimization magnetic flux calculating section and calculate the target magnetic flux $\phi_r/dt$ and its first-order differentiated value $d\phi_r/dt$ using the following equation:

$$\phi_r = \frac{1}{1 + \tau_\phi \cdot S} \phi_r{}^*,$$

wherein $\tau_\phi$ denotes a time constant of the target magnetic flux $\phi_r$ and S denotes a Laplace operator;

c) a target torque calculating section which calculates a target torque $T_m$ in response to the received torque instruction value $T_e{}^*$ as follows:

$$T_m = \frac{1}{1 + \tau_T \cdot S} T_e{}^*,$$

wherein $\tau_T$ denotes a time constant of the target torque $T_m$;

d) a vector control calculating section which receives the target magnetic flux $\phi_r$, its first-order differentiated value, and target torque, and a motor revolution speed and calculates an instruction value of an excitation current $i_\phi{}^*$ and an instruction value of a torque current $i_T{}^*$ as follows:

$$i_T{}^* = \omega_{se\text{-}opt} L_r \phi_r / (M \cdot R_r),$$

$$i_\phi{}^* = (1/M) \cdot \phi_r + L_r/(M \cdot R_r) \cdot d\phi_r/dt;$$

e) means for calculating a motor revolution frequency $\omega_{re}$ from a motor revolution speed N detected by means of a speed sensor attached about an output axle of the induction motor, adding the motor revolution frequency to the slip frequency $\omega_{se\text{-}opt}$ to derive a motor power supply frequency $\omega$, and integrating the power supply frequency $\omega$ to derive an electrical angle $\theta$;

f) coordinate converting section which is so constructed as to receive the instruction values of $i_\phi{}^*$ and $i_T{}^*$ and electrical angle $\theta$ to convert them into three-phase current value $i_u{}^*$, $i_v{}^*$, and $i_w{}^*$; and g) means for driving the induction motor so as to make currents flowing through the induction motor coincident with said current instruction values.

20. A system for controlling an induction motor applicable to an electric motor-driven vehicle as claimed in claim 19, wherein said copper loss $L_c$ is expressed as follows:

$$\begin{aligned} L_c &= (i_{\gamma s}^2 + i_{\delta s}^2) R_s + (i_{\gamma r}^2 + i_{\delta r}^2) R_r \\ &= T_e/P \cdot \{(1 + R_s L_r^2/(R_r M^2)) \omega_{se} + \\ &\quad (R_s R_r/M^2) \cdot 1/\omega_{se}\} + \\ &\quad \{K_1 \cdot (d\phi_r/dt)^2 + K_2 \cdot \phi_r \cdot d\phi_r/dt\}, \end{aligned}$$

wherein $K_1$ and $K_2$ denotes constants determined according to the motor and subscripts of $\gamma$ and $\delta$ denotes the $\gamma$-$\delta$ coordinate system rotating with the power supply frequency of the motor denoted by $\omega$ and wherein the slip frequency $\omega_{se}$ which minimizes the steady-state copper loss is derived from said equation $L_c$ in which $d/dt\phi_r$ is zero and when calculating $\omega_{se\text{-}opt}$ from the equation of $L_c$ with $dL_c/d\omega_{se}=0$.

21. A system for controlling an induction motor applicable to an electric motor-driven vehicle as claimed in claim 20, wherein said time constant $\tau_T$ of the target torque is fixed.

22. A system for controlling an induction motor applicable to an electric motor-driven vehicle as claimed in claim 20, wherein said time constant $\tau_\phi$ of the target magnetic flux is varied according to a magnitude of the target magnetic flux $\phi_r$ so that the transfer function of the target magnetic flux calculating section is varied and a transient copper loss of the induction motor is reduced.

23. A system for controlling an induction motor applicable to an electric motor-driven vehicle as claimed in claim 20, which further comprises remaining capacity detecting mean for detecting a remaining capacity of a battery connected to the motor driving means, said battery being used to supply the driving power to the motor via said motor driving means, and wherein said target magnetic flux calculating section has a one-order low pass filter whose time constant $\tau_\phi$ is determined according to the remaining capacity of the battery.

24. A system for controlling an induction motor applicable to an electric motor-driven vehicle as claimed in claim 23, wherein said time constant $\tau_T$ of the target torque calculating section is varied according to the remaining capacity of the battery.

25. A system for controlling an induction motor applicable to an electric motor-driven vehicle as claimed in claim 24, wherein when the remaining capacity of the battery is decreased, the values of the time constants of $\tau_\phi$ and $\tau_T$ are increased so that a torque response to the torque instruction value becomes slower and the decrease of the remaining capacity of the battery is reduced.

26. A system for controlling an induction motor applicable to an electric motor-driven vehicle as claimed in claim 25, wherein said remaining capacity detecting means detects the remaining capacity of the battery as follows:

$$C_b{}' = C_{b0} - \int (V_b \cdot i_b) dt,$$

wherein $C_{b0}$ denotes a charged quantity of the battery when fully charged, $V_b$ denotes a terminal voltage of the battery, and $i_b$ denotes a current flowing through the battery.

27. A system for controlling an induction motor applicable to an electric motor-driven vehicle as claimed in claim 26, wherein during the regenerative drive state, the motor serves as a generator and the regenerated power is supplied to the battery during a braking of the vehicle.

28. A system for controlling an induction motor applicable to an electric motor-driven vehicle as claimed in claim 27, wherein said battery is a lead storage battery.

29. A system for controlling an induction motor applicable to an electric motor-driven vehicle as claimed in claim 28, wherein said motor driving means is a current control type PWM inverter.

30. A system for controlling an induction motor applicable to an electric motor-driven vehicle as claimed in claim 29, wherein said coordinate converting means comprises a d-q axis coordinate system and $\gamma$-$\delta$ coordinate system.

31. A system for controlling an induction motor applicable to an electric motor-driven vehicle as claimed in claim 19, which further comprises:

h) a torque instruction value generating section which generates the torque instruction corresponding to a power drive state in which a load is driven from the induction motor and generates the torque instruction value having an opposite sign to the power drive state when such a regenerative state that the induction motor is driven from the load; and i) an absolute value circuit which outputs an absolute value of the torque instruction value from said torque instruction value generating section, and wherein said steady state copper loss minimization magnetic flux calculating section calculates the rotor magnetic flux which minimizes the steady-state copper loss of the induction motor in response to the torque instruction value having the absolute value and said target torque calculating section calculates the target torque in response to the torque instruction value on the basis of the predetermined transfer characteristic which is different according to a power drive state in which a load is driven from the induction motor and a regenerative state in which the motor is driven from the load.

32. A system for controlling an induction motor applicable to an electric motor-driven vehicle as claimed in claim 31, wherein said torque instruction value generating section comprises:

an acceleration sensor which outputs a signal indicative of an operating variable of an accelerator through which a vehicle driver operated;

a differentiator which differentiates the output signal of said acceleration sensor;

a negative comparator which compares the output differentiated signal of the differentiator with a predetermined value and outputs a signal indicative of a logic "1" when the differentiated output signal negatively exceeds the predetermined value;

a switching circuit which is turned on when the logic signal of "1" is supplied thereto from said negative comparator;

a sample/hold circuit which holds the differentiated output signal of the differentiator passed through the switching circuit and is reset to zero in response to a reset signal;

a positive comparator which compares the differentiated output signal off the differentiator with another predetermined value and outputs a signal indicative of the reset signal to the sample/hold circuit when the differentiated output signal of the differentiator positively exceeds the other predetermined value, the output signal of the sample/hold circuit being a regeneration instruction signal $C_s$ indicative of the regenerative state;

a reference variable negative power supply which supplies a variable negative voltage which is varied according to the magnitude of the regeneration instruction signal $C_s$; and an idling switch which is switched to the acceleration sensor side when the vehicle driver operates the accelerator so that the torque instruction value $T_e^*$ indicates a positive value and which is switched to the negative variable reference power supply side when the vehicle driver releases from the accelerator so that the operating variable equals to zero.

33. A system for controlling an induction motor applicable to an electric motor-driven vehicle as claimed in claim 32, wherein the target magnetic flux $\phi_r$ is always positive and the torque current instruction value gives a negative value when the torque instruction value $T_e^*$ indicates a negative value when a motor driving mode is in the regenerative state.

34. A system for controlling an induction motor applicable to an electric motor-driven vehicle as claimed in claim 33, wherein the time constants of $\tau_\phi$ and $\tau_T$ of the target magnetic flux $\phi_r$ and target torque $T_m$ are determined according to the regeneration instruction signal $C_s$.

35. A system for controlling an induction motor applicable to an electric motor-driven vehicle as claimed in claim 34, wherein when the regeneration instruction signal $C_s$ becomes larger, both time constants of $\tau_\phi$ and $\tau_T$ provide relatively small values which are larger that those during the power drive state and when the regeneration instruction signal $C_s$ becomes small, both time constants of $\tau_\phi$ and $\tau_T$ provide relatively large values.

36. A system for controlling an induction motor applicable to an electric motor-driven vehicle as claimed in claim 19, wherein said target torque calculating section calculates the target torque $T_m$ using a first-order low pass filter transfer function having a cut-off frequency $\omega_T$ in a Laplace transform in place of $T_m = 1/(1+S\cdot\tau_T)T_e^*$ as follows;

$$T_m = 1/(1+S/\omega_\phi)\cdot T_e^* \ (=\omega_\phi/(S+\omega_\phi)\cdot T_e^*),$$

and which further comprises a target magnetic flux cut-off frequency calculating section which receives the cut-off frequency $\omega_T$ from said target torque calculating section and the slip frequency $\omega_{se\text{-}opt}$ which minimizes the steady-state loss of $L_c$ and calculates a cut-off frequency $\omega_\phi$ of a target magnetic flux transfer function as:

$$\omega_\phi = \sqrt{(\omega_T \omega_{se\text{-}opt})}.$$

37. A system for controlling an induction motor applicable to an electric motor-driven vehicle as claimed in claim 36, wherein the slip frequency which minimizes the steady state loss and which is supplied to the target magnetic flux cut-off frequency calculating section is expressed as follows:

$$\omega_{se\text{-}opt} = \sqrt{(R_s R_r^2/(R_s L_r^2 + R_r M^2))}.$$

38. A system for controlling an induction motor applicable to an electric motor-driven vehicle as claimed in claim 37, wherein said slip frequency $\omega_{se\text{-}opt} = \sqrt{(R_s R_r^2/(R_s L_r^2 + R_r M^2))}$ is varied with a variation of the rotor resistance $R_r$ according to a temperature in the motor and said slip frequency $\omega_{se\text{-}opt}$ is set according to the variation of the rotor resistance in accordance with the temperature.

39. A system for controlling an induction motor applicable to an electric motor-driven vehicle as claimed in claim 38, wherein an excitation current $i_\phi$ when a step function of the torque instruction value is input and $K=1$ is expressed as:

$$i_\phi[1] = \omega_\phi L_r/(MR_r)\cdot(R_r/L_r - \omega_\phi)\cdot\phi_r^*[0] + (\omega_\phi L_r)/(MR_r)\cdot\phi_r^*[0]$$

and a torque current $i_T$ at $K=1$ is expressed as:

$$i_T[1] = L_r/(PM)\cdot\Delta\omega_T T_e^*[0]/\Delta\omega_\phi\cdot\phi_r^*[0],$$

and when $i_\phi[1] = i_T[1]$ and $\Delta \approx 0$, $\omega_\phi$ is obtained.

40. A method for controlling an induction motor, comprising the steps of:
- a) calculating a rotor magnetic flux which minimizes a steady-state loss of the induction motor in response to a torque instruction value;
- b) receiving said calculated rotor magnetic flux and calculating a target magnetic flux and a first-order differentiated value of the target magnetic flux on the basis of a transfer function having a low pass filter characteristic;
- c) calculating a target torque value of the induction motor on the basis of a predetermined transfer function in response to a torque instruction value;
- d) detecting a revolution speed of the induction motor;
- e) calculating a current instruction value on the basis of predetermined circuit constants of an equivalent circuit of the induction motor and according to the calculated target magnetic flux, the first-order differentiated value of the target magnetic flux, the calculated target torque value, and revolution speed of the motor; and
- f) driving the induction motor so that a current actually passing through the induction motor approaches the current instruction value, and, so that an output torque of the induction motor has a value corresponding to the target torque.

* * * * *